(12) United States Patent  
Ma et al.

(10) Patent No.: US 9,052,744 B2
(45) Date of Patent: Jun. 9, 2015

(54) METHOD AND APPARATUS FOR CONTROLLING USER INTERFACE OF ELECTRONIC DEVICE USING VIRTUAL PLANE

(75) Inventors: Gengyu Ma, Yongin-si (KR); Young-su Moon, Seoul (KR); Yong-seok Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1686 days.

(21) Appl. No.: 11/882,443

(22) Filed: Aug. 1, 2007

(65) Prior Publication Data

US 2008/0120577 A1 May 22, 2008

(30) Foreign Application Priority Data

Nov. 20, 2006 (KR) .................. 10-2006-0114716

(51) Int. Cl.
*G06F 3/048* (2013.01)
*G06F 3/033* (2013.01)
*G06F 3/01* (2006.01)
*G06F 3/03* (2006.01)

(52) U.S. Cl.
CPC .............. *G06F 3/017* (2013.01); *G06F 3/0325* (2013.01)

(58) Field of Classification Search
USPC ................................................ 715/863, 964
See application file for complete search history.

(56) References Cited

U.S. PATENT DOCUMENTS

| | | | |
|---|---|---|---|
| 5,594,469 A | | 1/1997 | Freeman et al. |
| 6,147,678 A * | | 11/2000 | Kumar et al. ................ 345/158 |
| 6,175,362 B1 | | 1/2001 | Harms et al. |
| 6,385,331 B2 * | | 5/2002 | Harakawa et al. ............ 382/106 |
| 7,029,275 B2 * | | 4/2006 | Rubbert et al. ................. 433/24 |
| 7,034,807 B2 | | 4/2006 | Maggioni |
| 7,058,204 B2 * | | 6/2006 | Hildreth et al. ............... 382/103 |
| 7,598,942 B2 * | | 10/2009 | Underkoffler et al. ........ 345/158 |
| 2003/0233237 A1 * | | 12/2003 | Garside et al. ................ 704/270 |
| 2004/0242988 A1 * | | 12/2004 | Niwa et al. .................... 600/407 |
| 2005/0088409 A1 * | | 4/2005 | Van Berkel ................... 345/157 |
| 2005/0094019 A1 * | | 5/2005 | Grosvenor et al. ........... 348/335 |
| 2005/0166163 A1 * | | 7/2005 | Chang et al. .................. 715/863 |
| 2006/0168523 A1 * | | 7/2006 | Yoda et al. .................... 715/728 |
| 2006/0209068 A1 * | | 9/2006 | Ajioka et al. ................. 345/427 |
| 2006/0265653 A1 * | | 11/2006 | Paasonen et al. ............. 715/704 |

FOREIGN PATENT DOCUMENTS

EP 0571712 A2 12/1993

* cited by examiner

*Primary Examiner* — Stephen Alvesteffer
(74) *Attorney, Agent, or Firm* — NSIP Law

(57) ABSTRACT

Provided is a method and apparatus for controlling a user interface (UI) of an electronic device by using a specific region of a virtual plane. In the method, the virtual plane is initialized according to spatial coordinates of two or more images detected by using locations of the images displayed in an image display unit of a first image capture device and an image display unit of a second image capture device. Furthermore, the location of a marker is determined and is indicated by a specific image on the virtual plane. Furthermore, a screen pointer corresponding to the marker is displayed at a position where the marker is located in an image display unit corresponding to the virtual plane. Furthermore, a menu of the electronic device is selected which is pointed to by the screen pointer while moving the marker. Accordingly, a user can conveniently control the UI of the electronic device by performing a simple operation.

39 Claims, 20 Drawing Sheets

Far → Near    Down

METHOD AND APPARATUS FOR CONTROLLING USER INTERFACE OF ELECTRONIC DEVICE USING VIRTUAL PLANE

CROSS-REFERENCE TO RELATED PATENT APPLICATION

This application claims the benefit of Korean Patent Application No. 10-2006-0114716, filed on Nov. 20, 2006, in the Korean Intellectual Property Office, the disclosure of which is incorporated herein in its entirety by reference.

BACKGROUND OF THE INVENTION

1. Field of the Invention

The present invention relates to human computer interaction (HCI) such as computer vision, pattern recognition, and gesture recognition, and more particularly, to an apparatus and method for easily controlling a user interface (UI) of an electronic device by using a virtual plane.

2. Description of the Related Art

Remote controls have been conventionally used to control electronic devices such as television sets (TVs). Remote controls facilitate control of the electronic devices. However, as electronic devices have become more complex than before, the number of buttons of the remote controls has consequently increased in order to control the electronic devices. Today, a TV remote control has about 20 buttons. Thus, it is not easy to remember all the functions assigned to the respective buttons. Moreover, with the increase in functions of desktop video (DTV), a controller for controlling these functions requires more space.

In order to solve this problem, several methods have been proposed to control an electronic device in an easy and convenient manner by detecting the motion of a user without having to use a separate controller. The methods include a method in which one image capture device is attached to a TV so as to classify pixels of images received from the image capture device. However, in this method, a user has to be within a specific region that is not far from a fixed light beam, thus enabling the reception of a user input. That is, there is a problem in that a radius of action of the user is restricted. Furthermore, in this method, since a user's hand is detected according to skin color, the detection cannot be properly made when illumination around the user changes. Furthermore, since different actions of the user are assigned to operations of the electronic device, the user has to remember a lot of actions, which is inconvenient. Alternatively, there is a method in which a fingertip is detected by a plurality of image capture devices so that the electronic device can be controlled according to a three-dimensional position of the detected fingertip. However, this method still causes inconvenience in terms of installing the image capture devices since three image capture devices have to be installed at a fixed location such as on the wall or ceiling. Moreover, there has been a difficulty in controlling screen icons because even an insignificant motion of a finger results in a large motion on a screen of the electronic device. In addition, there is another disadvantage in that the electronic device can only be used in a fixed location.

SUMMARY OF THE INVENTION

The present invention provides a method and apparatus for controlling a user interface (UI) of an electronic device by using a virtual plane created regardless of a user's location, wherein an input is received at any location desired by a user or an input region is automatically determined according to the user's location when the UI of the electronic device is controlled.

The present invention also provides a computer-readable medium having embodied thereon a computer program for executing the above method.

According to an aspect of the present invention, there is provided a method of controlling a UI (user interface) of an electronic device by using a virtual plane, the method comprising: initializing the virtual plane according to spatial coordinates of two or more images detected by using locations of the images displayed in an image display unit of a first image capture device and an image display unit of a second image capture device; determining a location of a marker indicated by a specific image on the virtual plane; displaying a screen pointer corresponding to the marker at a position where the marker is located in an image display unit corresponding to the virtual plane; and selecting a menu of the electronic device pointed to by the screen pointer while moving the marker.

According to another aspect of the present invention, there is provided a computer-readable medium having embodied thereon a computer program for executing the above method.

According to another aspect of the present invention, there is provided an apparatus for controlling a UI of an electronic device by using a virtual plane, the apparatus comprising: a first image capture unit and a second unit capture unit which capture images; a virtual plane initializing unit which initializes the virtual plane according to spatial coordinates of two or more images detected by using locations of the images displayed in an image display unit of a first image capture device and an image display unit of a second image capture device when the first and second image capture units capture the images; a marker positioning unit which determines a spatial location of a marker according to a specific image captured by the first and second image capture units and determines a location of the marker on the virtual plane by mapping the spatial location of the marker to a position on the virtual plane; and an arithmetic unit which computes a location of a screen pointer, which appears on the image display units of the electronic device and corresponds to the location of the marker, and which selects a menu of the electronic device pointed to by the screen pointer that moves along with the movement of the marker.

In the method and apparatus for controlling a UI of an electronic device by using a virtual plane, the virtual plane is initialized according to spatial coordinates of two or more images detected by using locations of the images displayed in an image display unit of a first image capture device and an image display unit of a second image capture device. Furthermore, the location of a marker is determined and is indicated by a specific image on the virtual plane. Furthermore, a screen pointer corresponding to the marker is displayed at a position where the marker is located in an image display unit corresponding to the virtual plane. Furthermore, a menu of the electronic device is selected which is pointed to by the screen pointer while moving the marker. Accordingly, a user can initialize the virtual plane by performing a simple operation such as making a gesture or changing eye positions. Therefore, there is an advantage in that the UI of the electronic device can be conveniently controlled by performing a simple operation by using the virtual plane created regardless of a user's location.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention may, be embodied in many different forms and should not be construed as being limited to the aforementioned aspects set forth herein. The following aspects of the present invention are provided so that this disclosure will be thorough and complete, and will fully convey the concept of the invention to those skilled in the art.

Hereinafter, exemplary embodiments of the present invention will be described in detail with reference to the accompanying drawings.

Figure 1:
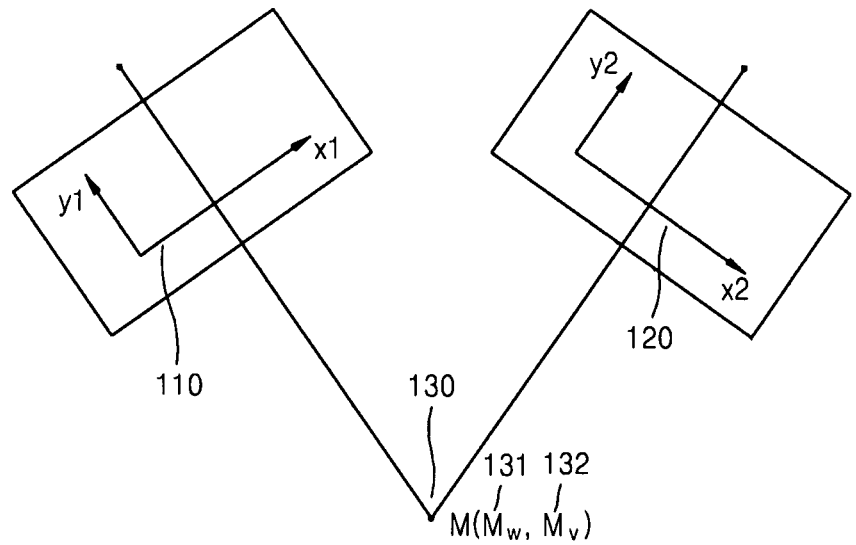
FIG. 1 illustrates main elements and their geometric relationships according to an embodiment of the present invention.
Figure 1:
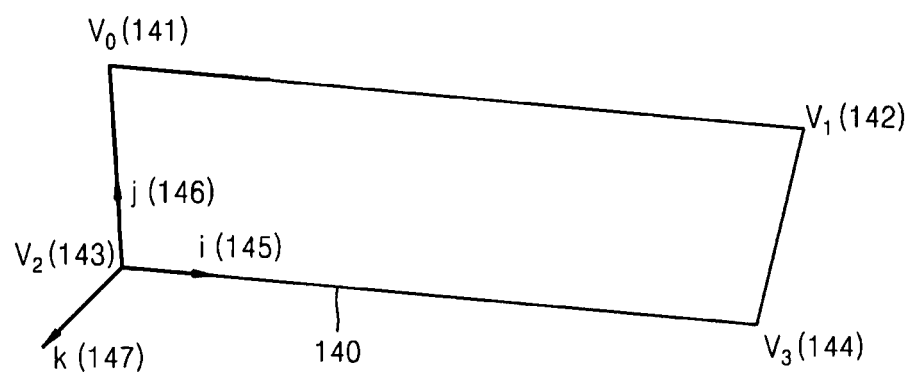
Figure 1:
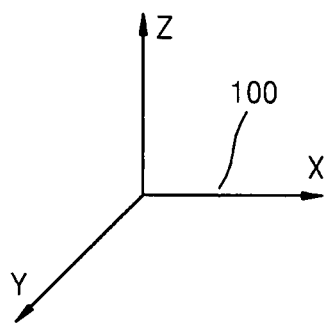

FIG. 1 illustrates main elements and their geometric relationships according to an embodiment of the present invention. 100(X,Y,Z) is represented in a world coordinate system. The world coordinate system is used when a location of a figure is designated by an application program for computer graphics (CG). The world coordinate system is irrelevant to a device. That is, the world coordinate system is a device-independent Cartesian coordinate system. The location of a specific image existing in space can be represented in the world coordinate system. $110(x1, y1)$ indicates a position where an image in front of the electronic device is displayed in an image display unit of a first image capture device. $120(x2, y2)$ indicates a position where an image in front of the electronic device is displayed in an image display unit of a second image capture device. The image capture devices capture images by using a lens. The images are displayed in the image display units. Cameras are generally used as the image capture devices. However, the present invention is not limited thereto. 130(M) indicates a marker. The marker is indicated by a spatial coordinate position 130(Mw) and a virtual planar position 132(Mv). A virtual plane is indicated by 140. The virtual plane 140 acts as an interface in order to control a user interface (UI) of the electronic device. The virtual plane 140 is indicated by four vertices 141 (V0), 142(V1), 143(V2), and 144(V3) in the world coordinate system. (i, j, k)(145, 146, 147) is a unit vector that represents coordinate axes of the virtual plane 140 in the world coordinate system.

Figure 2:
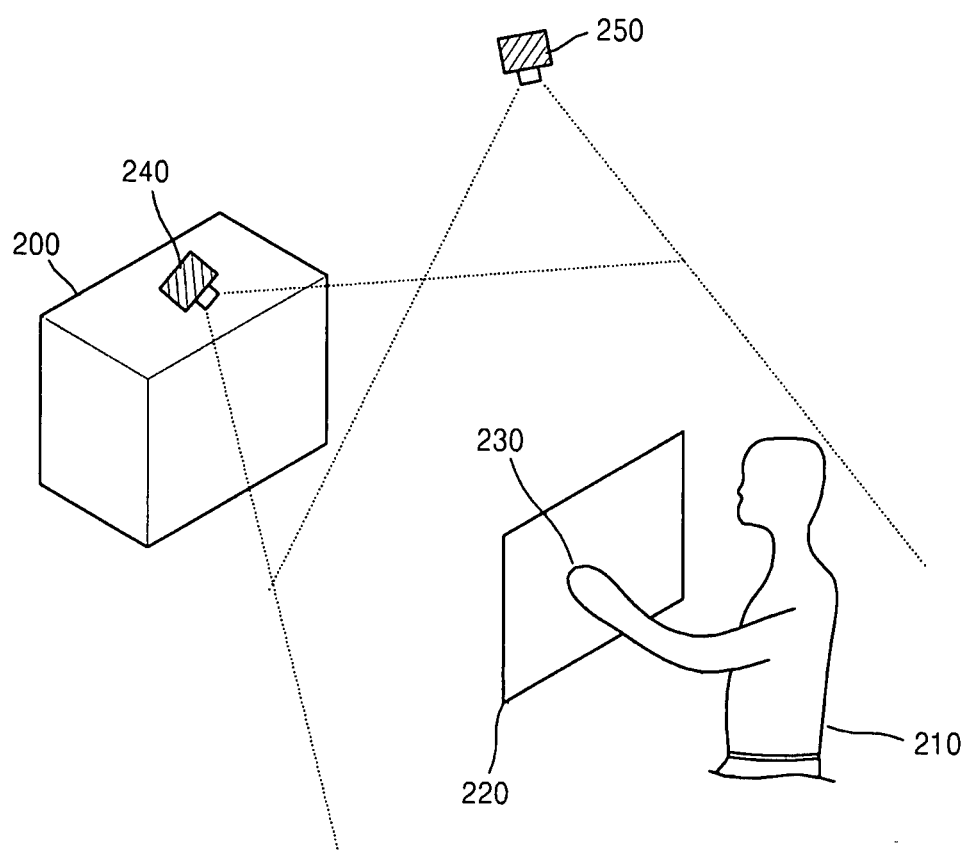
FIG. 2 illustrates locations of the main elements in greater detail according to an embodiment of the present invention.

FIG. 2 illustrates locations of the main elements in greater detail according to an embodiment of the present invention.

A user 210 is in front of a TV 200. A virtual plane 220 is between the user 210 and the TV 200. A marker 230 is near the virtual plane 220 so as to control a UI of the TV 200. A first image capture device 240 and a second image capture device 250 initialize the virtual plane 220. The image capture devices 240 and 250 may be located at any place as long as an image of the user 210 can be captured.

Figure 3:
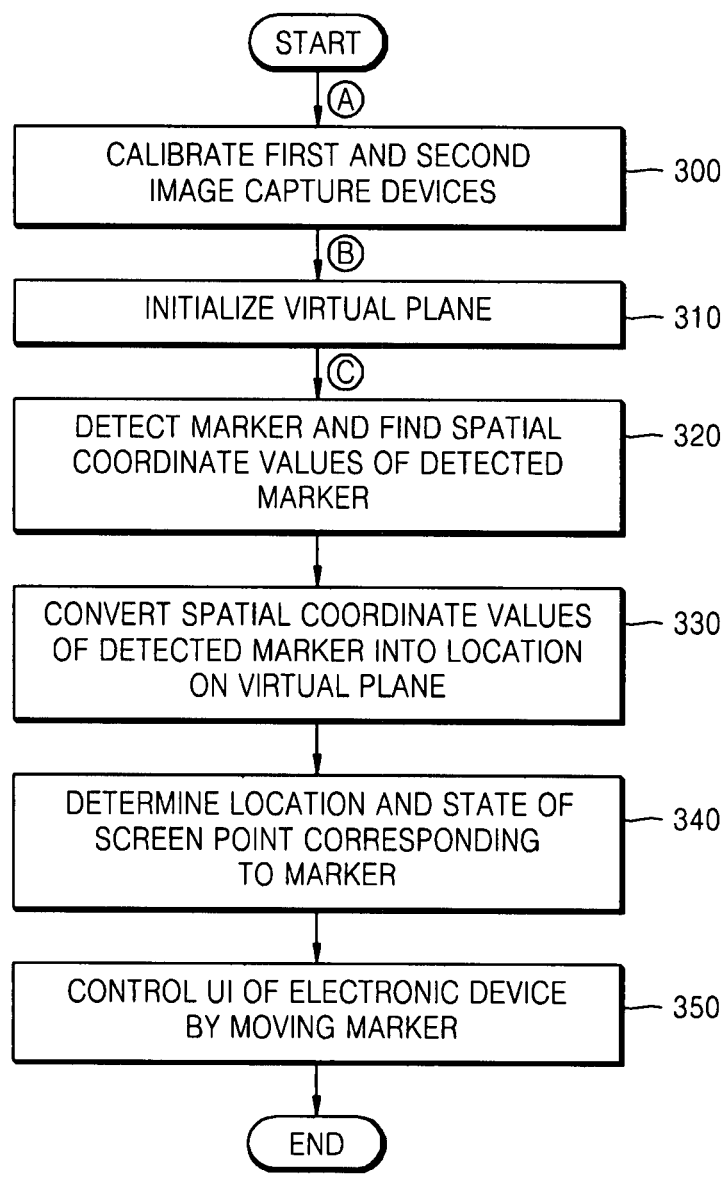
FIG. 3 is a flowchart illustrating a method of controlling a user interface (UI) of an electronic device by using a virtual plane according to an embodiment of the present invention.

FIG. 3 is a flowchart illustrating a method of controlling a UI of an electronic device by using a virtual plane according to an embodiment of the present invention.

In operation 300, first and second image capture devices are calibrated. Calibration is performed in order to estimate intrinsic parameters and extrinsic parameters of the image capture devices so as to determine a relationship between the location of an image on the virtual plane and the location of the image in actual space in the world coordinate system, wherein the image is captured by the image capture devices and is displayed in the image display units. Once the calibration of the image capture devices is completed, a spatial coordinate of the image can be detected by using only the locations of the image display units of the image capture devices. Each intrinsic parameter includes a focal distance f of an image capture device and a principal point (an intersection point (cx, cy) between an optical axis and an image surface). Each extrinsic parameter includes a coordinate location (t1, t2, t3) and a three-dimensional rotation matrix rij. In the present embodiment, in order to estimate the internal and external parameters, a checkerboard is used in which check patterns are formed and arranged at uniform intervals in four directions.

Figure 4A:
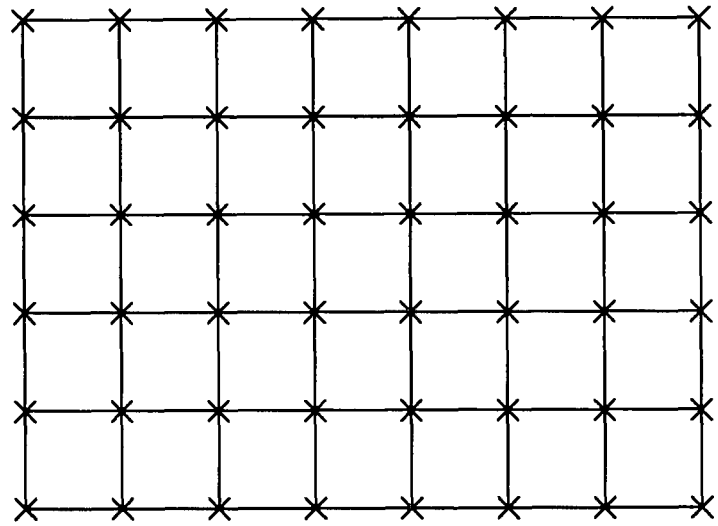
FIG. 4A illustrates a checkerboard used when an image capture device is calibrated according to an embodiment of an present invention.

FIG. 4A illustrates a checkerboard used when an image capture device is calibrated according to an embodiment of the present invention. Referring to FIG. 4A, in the present embodiment, the checkerboard has a size of 8*6. However, the present invention is not limited thereto.

Figure 4B:
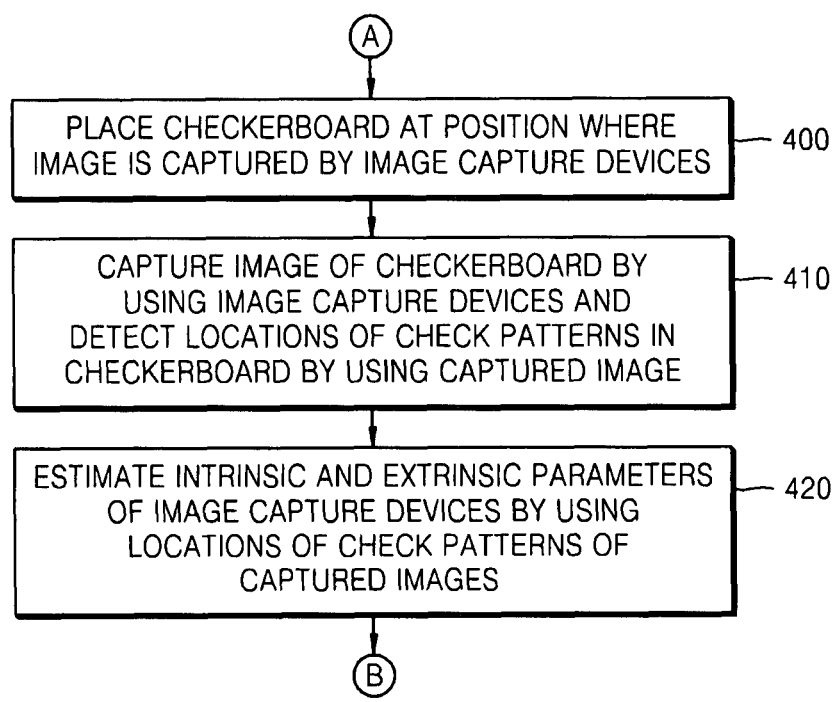
FIG. 4B illustrates operations for calibrating an image capture device in greater detail according to an embodiment of the present invention.

FIG. 4B illustrates operations for calibrating an image capture device in greater detail according to an embodiment of the present invention. The operations for calibrating an image capture device will now be described in detail with reference to FIG. 4B.

In operation 400, the checkerboard is placed at a position where an image is captured by the first image capture device 1 and the second image capture device 2.

In operation 410, an image of the checkerboard is captured by each of the image capture devices 1 and 2. Furthermore, the locations of check patterns of the checkerboard are detected by using the captured image.

In operation 420, the intrinsic and extrinsic parameters of the image capture devices 1 and 2 are estimated by using the locations of the check patterns of the captured image.

Coordinate values (u, v) of the check patterns are determined by using spatial coordinate values (X, Y, Z) of vertices, as expressed by Formula 1, intrinsic parameters, and extrinsic parameters.

$$\begin{pmatrix} U \\ V \\ 1 \end{pmatrix} = H \cdot R \cdot \begin{pmatrix} X \\ Y \\ Z \\ 1 \end{pmatrix} = \begin{pmatrix} f & 0 & Cx \\ 0 & f & Cy \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} X \\ Y \\ Z \\ 1 \end{pmatrix} \quad \text{[Formula 1]}$$

Herein, u denotes a coordinate value of a horizontal axis displayed in an image display unit of an image capture device, and v denotes a coordinate value of a vertical axis displayed in the image display unit of the image capture device. H denotes a 3*3 matrix composed of a focal distance f and principal points (cx, cy) which form the intrinsic parameters. R denotes a 3*4 matrix composed of a rotation matrix rij and a coordinate location (t, t2, t3) which form the extrinsic parameters. (X, Y, Z) denotes spatial coordinate values of a captured image.

H and R satisfying Formula 1 with the least error can be obtained by using Formula 2 with respect to all vertices.

$$\{H, R\} = \underset{H,R}{\operatorname{argmin}} \left\{ \sum_{a=1,2...n} \left| \begin{pmatrix} U_a \\ V_a \\ 1 \end{pmatrix} - H \cdot R \cdot \begin{pmatrix} X_a \\ Y_a \\ Z_a \\ 1 \end{pmatrix} \right| \right\} \quad \text{[Formula 2]}$$

Herein, u denotes a coordinate value of a horizontal axis displayed in an image display unit of an image capture device, and v denotes a coordinate value of a vertical axis displayed in the image display unit of the image capture device. H denotes a 3*3 matrix composed of a focal distance f and principal points (cx, cy) which form the intrinsic parameters. R denotes a 3*4 matrix composed of a rotation matrix rij and a coordinate location (t, t2, t3) which form the extrinsic parameters. (X, Y, Z) denotes spatial coordinate values of a captured image. Furthermore, a denotes vertices of a check pattern, and n denotes a total number of the vertices of the check pattern.

Referring back to FIG. 3, a method of controlling a UI of an electronic device by using a virtual plane will be described according to an embodiment of the present invention.

In operation 310, the virtual plane is initialized by using the calibrated first and second image capture devices. The virtual plane acts as an interface in order to control the UI of the electronic device. That is, the virtual plane is invisible to the human eye. The user can control the UI of the electronic device by using the virtual plane.

A method of initializing a virtual plane will now be described.

Figure 5A:
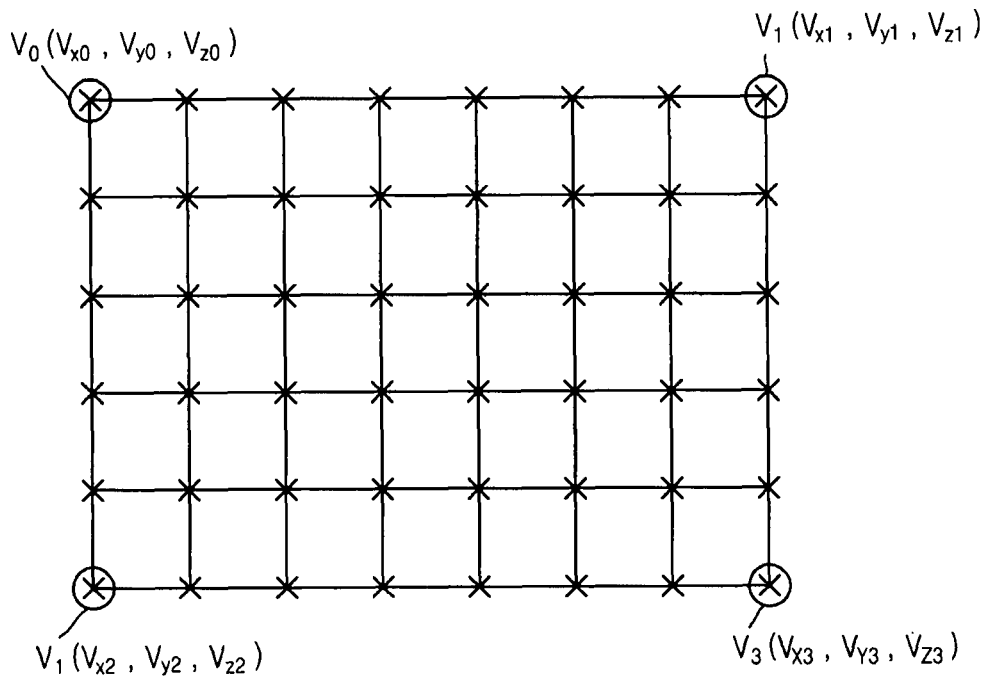
FIG. 5A illustrates a checkerboard used in a first example of initializing a virtual plane according to an embodiment of the present invention.

FIG. 5A illustrates a checkerboard used in a first example of initializing a virtual plane according to an embodiment of the present invention.

In the first example of initializing a virtual plane, spatial coordinate values of four edges of the virtual plane are found so as to initialize the virtual plane. In this case, the spatial coordinate values are obtained by using the checkerboard shown in FIG. 5A. Referring to FIG. 5A, coordinate values of the edges of the checkerboard are respectively indicated by V0(Vx0, Vy0, Vz0) at the left upper edge, V1(Vx1, Vy1, Vz1) at the right upper edge, V2(Vx2, Vy2, Vz2) at the left lower edge, and V3(Vx3, Vy3, Vz3) at the right lower edge. That is, the virtual plane is initialized by using the checkerboard illustrated in FIG. 5A.

Figure 5B:
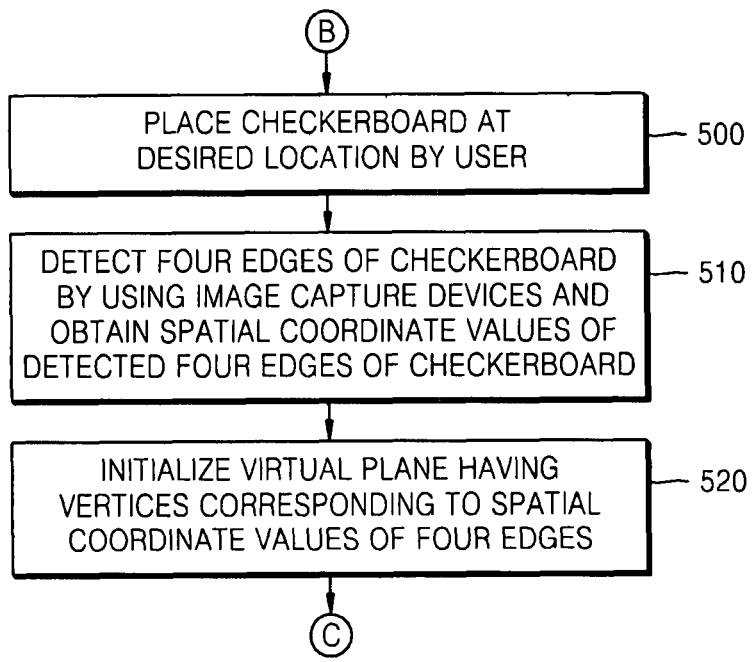
FIG. 5B is a flowchart illustrating a method of initializing a virtual plane by using the first example of initializing a virtual plane according to an embodiment of the present invention.

FIG. 5B is a flowchart illustrating a method of initializing a virtual plane by using the first example of initializing a virtual plane according to an embodiment of the present invention.

In operation 500, the user places the checkerboard at a desired location. The checkerboard is positioned where the virtual plane is initialized. In the first example of initializing a virtual board, the checkerboard has a size of 8*6 as shown in FIG. 5A. Since the distance between the image capture devices and the checkerboard is temporarily determined for the user's convenience, the distance is not limited to any particular distance.

In operation 510, each image capture device detects the four edges of the checkerboard so as to obtain spatial coordinate values of the detected four edges. That is, the spatial coordinate values of the four edges of the checkerboard is obtained according to the locations of the four edges of the checkerboard displayed on the image display units of the image capture devices.

Figure 5C:
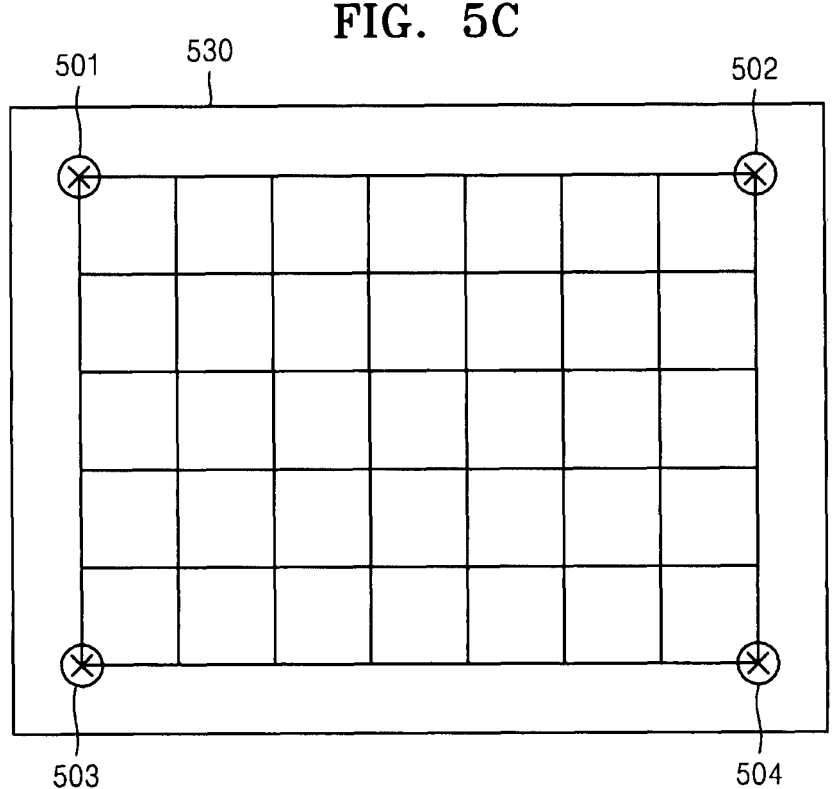
FIG. 5C illustrates an image of a checkerboard displayed in an image display unit of a first image capture device illustrated in FIG. 2 according to an embodiment of the present invention.

FIG. 5C illustrates an image of a checkerboard displayed in the image display unit 530 of the first image capture device illustrated in FIG. 2 according to an embodiment of the present invention. Referring to FIG. 5C, images of the four edges of the checkerboard displayed in the image display unit 530 of the first image capture unit are respectively indicated by 501 to 504.

Figure 5D:
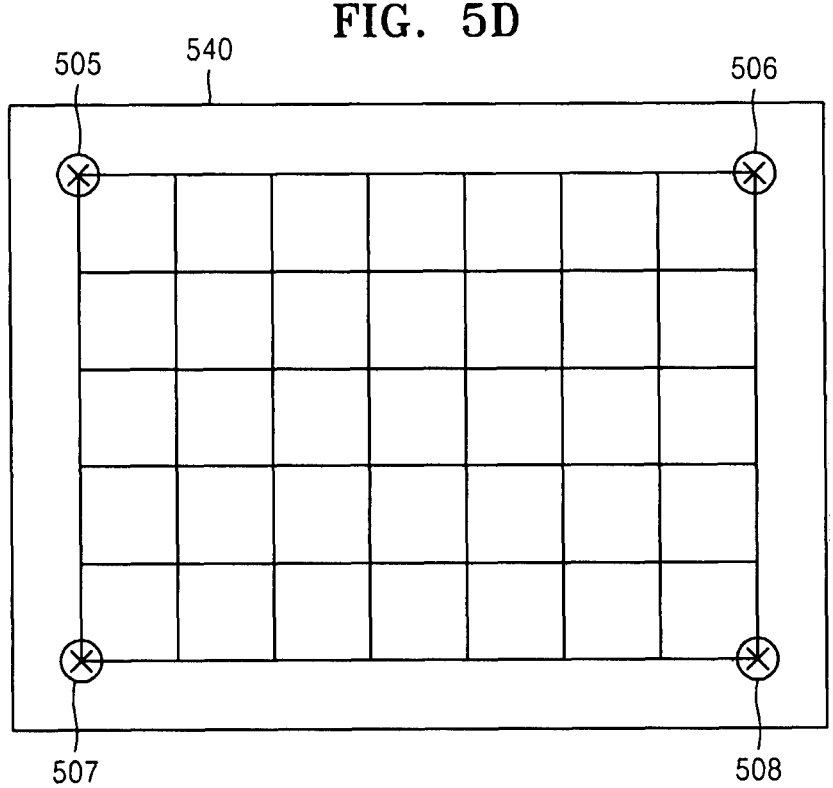
FIG. 5D illustrates an image of a checkerboard displayed in an image display unit of a second image capture device illustrated in FIG. 2 according to an embodiment of the present invention.

FIG. 5D illustrates an image of a checkerboard displayed in the image display unit 540 of the second image capture device illustrated in FIG. 2 according to an embodiment of the present invention. Referring to FIG. 5D, images of the four edges of the checkerboard displayed in the image display unit 540 of the second image capture unit are respectively indicated by 505 to 508. Spatial coordinate values (V0, V1, V2, V3) of the four edges of the checkerboard can be obtained by using Formula 3.

$$\{X, Y, Z\} = \underset{X,Y,Z}{\operatorname{argmin}} \left\{ \left\| \begin{pmatrix} u_l \\ v_l \\ 1 \end{pmatrix} - H \cdot R \cdot \begin{pmatrix} X \\ Y \\ Z \\ 1 \end{pmatrix} \right\| + \left\| \begin{pmatrix} u_r \\ v_r \\ 1 \end{pmatrix} - H \cdot R \cdot \begin{pmatrix} X \\ Y \\ Z \\ 1 \end{pmatrix} \right\| \right\}$$ [Formula 3]

Herein, ul denotes a horizontal coordinate value of an image detected by the first image capture device, and vl denotes a vertical coordinate value of the image detected by the first image capture device. Furthermore, ur denotes a horizontal coordinate value of an image detected by the second image capture unit, and vr denotes a vertical coordinate value detected by the second image capture device. H denotes a 3*3 matrix composed of a focal distance and the size of an image plane which form the intrinsic parameters. R denotes a 3*4 matrix composed of a rotation matrix and a coordinate location, which form the extrinsic parameters. (X, Y, Z) denotes spatial coordinate values of an image detected by an image capture device.

The spatial coordinate values of the four edges of the checkerboard obtained by using Formula 3 become the spatial coordinate values of the four edges of the virtual plane. According to Formula 3, the spatial coordinate values of the respective vertices are determined on the basis of coordinate values displayed in the image display units of the image capture devices and the intrinsic and extrinsic parameters of the image capture devices.

In operation 520, the virtual plane is initialized, wherein the virtual plane is a rectangular plane, vertices of which have the spatial coordinate values of the four edges of the virtual plane. In the first example of initializing a virtual plane, the virtual plane is initialized when the checkerboard is located at a desired place, thereby facilitating initialization of the virtual plane.

Figure 6A:
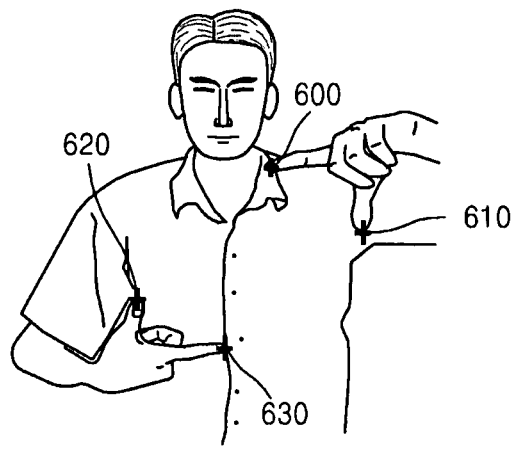
FIG. 6A illustrates a hand gesture used in a second example of initializing a virtual plane according to an embodiment of the present invention.

FIG. 6A illustrates a hand gesture used in a second example of initializing a virtual plane according to an embodiment of the present invention. In the second example of initializing a virtual plane, the hand gesture shown in FIG. 6A is used to initialize the virtual plane. That is, as shown in FIG. 6A, with respect to both hands, directions indicated by the thumb tips 610 and 620 are perpendicular to directions indicated by index fingertips 600 and 630. The direction indicated by the left index finger tip 600 is perpendicular to the direction indicated by the right thumb tip 620. The direction indicated by the left thumb tip 610 is perpendicular to the right index finger tip 630. The size of the virtual plane is determined by using the hand gesture. Then, the virtual plane is initialized. Although the hand gesture illustrated in FIG. 6A is used in the second example of initializing a virtual plane, the present invention is not limited thereto. Thus, any gesture may be used as long as it can detect the four images of the fingertips 600, 610, 620, and 630.

Figure 6B:
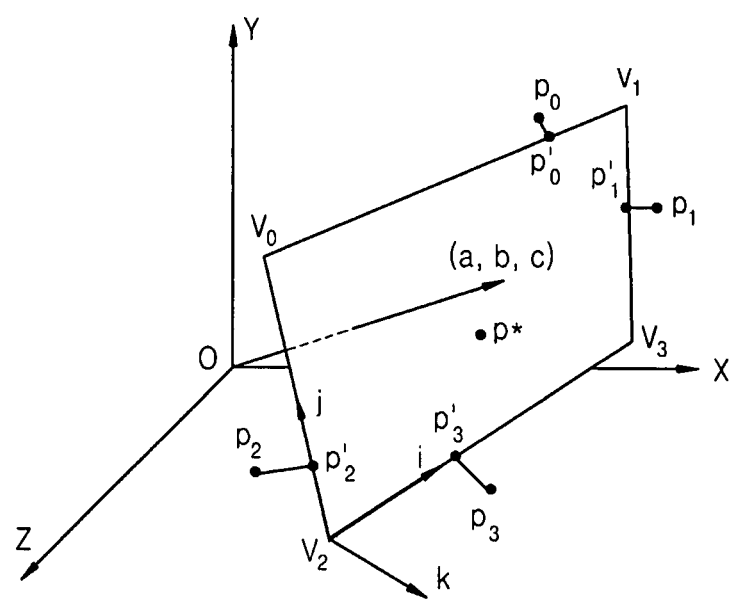
FIG. 6B illustrates a virtual plane of the world-coordinate system, which is initialized by using the second example of initializing a virtual plane according to an embodiment of the present invention.

FIG. 6B illustrates a virtual plane of the world-coordinate system, which is initialized by using the second example of initializing a virtual plane according to an embodiment of the present invention.

Referring to FIG. 6B, in the virtual plane that has been initialized by using the second example, four points V0, V1, V2, and V3 correspond to vertices of the virtual plane. In FIG. 6B, a vector (a, b, c) is shown, which is a normal vector perpendicular to the virtual plane. Four points p0, p1, p2, and p3 correspond to the four fingertips 600, 610, 620, and 630 shown in FIG. 6A. Another four points p'0, p'1, p'2, and p'3 are located on the virtual plane and are respectively perpendicular to the four points p0, p1, p2, and p3. p*(Xp*, Yp*, Zp*) is a spatial coordinate corresponding to the center of the four points p0, p1, p2, and p3. The virtual plane passes through p*(Xp*, Yp*, Zp*).

Figure 6C:
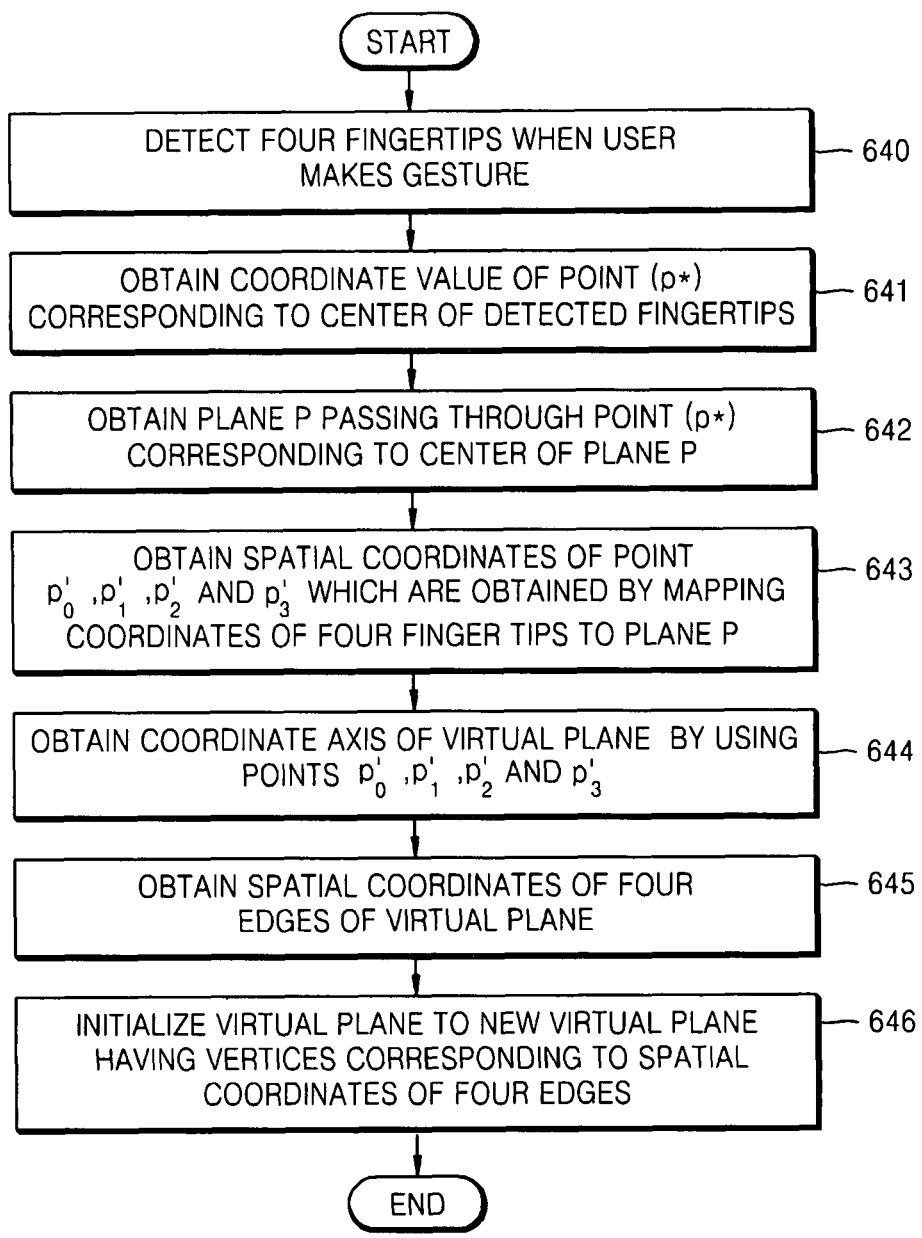
FIG. 6C is a flowchart illustrating a procedure for initializing a virtual plane by using the second example of initializing the virtual panel according to an embodiment of the present invention.

FIG. 6C is a flowchart illustrating a procedure for initializing a virtual plane by using the second example of initializing the virtual panel according to an embodiment of the present invention. This procedure will now be described with reference to FIG. 6C.

In operation 640, four fingertips 600, 610, 620, and 630 are detected from the hand gesture made by the user. That is, spatial coordinate values of the four points p0, p1, p2, and p3 illustrated in FIG. 6B are respectively detected. These spatial coordinate values are detected by using the first image capture device 240 and the second image capture device 250 illustrated in FIG. 2.

In operation 641, coordinate values of the points p*(Xp*, Yp*, Zp*) corresponding to the center of the four finger tips 600, 610, 620, and 630 detected in operation 640 are obtained. The point P*(Xp*, Yp*, Zp*) is the center of the four spatial coordinate values detected in operation 640, and thus the coordinate values can be obtained by using Formula 4.

$$p^* = (p0+p1+p2+p3)/4 \quad \text{[Formula 4]}$$

Herein, p0 denotes a spatial coordinate value of the left index fingertip 610, p1 denotes spatial coordinate values of the left thumb tip 610, p2 denotes spatial coordinate values of the right thumb tip 620, and p3 denotes spatial coordinate values of the right index fingertip 630.

In operation 642, a plane P is obtained that passes through the point p* corresponding to the center of the plane P. In general, a plane equation is expressed by Formula 5.

$$(x, y, z) \cdot \begin{pmatrix} a \\ b \\ c \end{pmatrix} = d \quad \text{[Formula 5]}$$

Herein, $$\begin{pmatrix} a \\ b \\ c \end{pmatrix}$$

denotes a normal vector perpendicular to a virtual plane, and its size is 1.) That is, a2+b2+c2=1.

The equation for the plane P can be obtained according to Formula 5 by using the normal vector $$\begin{pmatrix} a \\ b \\ c \end{pmatrix}$$

and a value d. The plane P is determined as a plane having the shortest distance from the four points p0, p1, p2, and p3. In general, the distance between a plane and a point can be obtained by using Formula 6.

$$dist(p, \text{plane}) = (p - p*)^T \begin{pmatrix} a \\ b \\ c \end{pmatrix} \quad \text{[Formula 6]}$$

Herein, p denotes a point corresponding to a fingertip, and p* denotes a point corresponding to the center of four fingertips.

The resultant value of Formula 6 may be a negative value. Thus, the normal vector $$\begin{pmatrix} a \\ b \\ c \end{pmatrix}$$

is obtained by using another Formula obtained by squaring Formula 6.

That is, the normal vector $$\begin{pmatrix} a \\ b \\ c \end{pmatrix}$$

is obtained by using Formula 7.

$$\begin{pmatrix} a \\ b \\ c \end{pmatrix} = \underset{a,b,c}{\operatorname{argmin}} \left\{ \sum_{i=0,1,2,3} dist^2(p, \text{plane}) \right\} \quad \text{[Formula 7]}$$

That is, a normal vector is obtained by using Formula 7 at the shortest distance between the plane P and the four points p0, p1, p2, and p3. In conclusion, the plane P is defined as a plane having a minimal sum of distances between the four points p0, p1, p2, and p3 and the plane P. Since the plane P passes through the point p*(Xp*, Yp*, Zp*) corresponding to the center of the four fingertips, the value d is obtained by substituting the point p*(Xp*, Yp*, Zp*) into Formula 5. Accordingly, the normal vector $$\begin{pmatrix} a \\ b \\ c \end{pmatrix}$$

and the point d are obtained by using Formula 5 and Formula 7, thereby finding the plane P passing through the point P* corresponding to the center of the four fingertips.

In operation 643, spatial coordinates of four points p'0, p'1, p'2, and p'3 are obtained which are found by mapping the spatial coordinates obtained in operation 640 to the plane P. The plane P obtained in operation 642 has the shortest distance from the four points p0, p1, p2, and p3. The four points p0, p1, p2, and p3 may not be located on the plane P. Therefore, the four points p0, p1, p2, and p3 have to be mapped to the plane P so as to obtain the four points p'0, p'1, p'2, and p'3 located on the plane P. The four points p'0, p'1, p'2, and p'3 can be obtained by using Formula 8.

$$p'_i = p_i - \left( p_i^T \cdot \begin{pmatrix} a \\ b \\ c \end{pmatrix} - d \right) \cdot \begin{pmatrix} a \\ b \\ c \end{pmatrix} \quad \text{[Formula 8]}$$

The four points p'0, p'1, p'2, and p'3 obtained by using Formula 8 are located on the plane P, thereby satisfying Formula 5. Therefore, the validity of Formula 8 can be evaluated by using Formula 9.

$$p'^T_i \cdot \begin{pmatrix} a \\ b \\ c \end{pmatrix} = \left( p_i - \left( p_i^T \cdot \begin{pmatrix} a \\ b \\ c \end{pmatrix} - d \right) \cdot \begin{pmatrix} a \\ b \\ c \end{pmatrix} \right)^T \cdot \begin{pmatrix} a \\ b \\ c \end{pmatrix} \quad \text{[Formula 9]}$$

$$= (p_i^T - (a, b, c) \cdot ((a, b, c) \cdot p_i - d)) \cdot \begin{pmatrix} a \\ b \\ c \end{pmatrix}$$

-continued $$= p_i^T \cdot \begin{pmatrix} a \\ b \\ c \end{pmatrix} - (a, b, c) \cdot p_i \cdot (a, b, c) \cdot \begin{pmatrix} a \\ b \\ c \end{pmatrix} +$$

$$(a, b, c) \cdot d \cdot \begin{pmatrix} a \\ b \\ c \end{pmatrix}$$

$$= p_i^T \cdot \begin{pmatrix} a \\ b \\ c \end{pmatrix} - (a, b, c) \cdot p_i + d$$

$$= d$$

As expressed by Formula 9, the normal vector $$\begin{pmatrix} a \\ b \\ c \end{pmatrix}$$

is multiplied by both members of Formula 8. Since the left member of Formula 9 is equivalent to that of Formula 5, the left member is equivalent to d. The computation result of the right member of Formula 9 is also equivalent to d since $a^2+b^2+c^2=1$. This proves that the coordinates of the four points p'0, p'1, p'2, and p'3 located on the plane P can be obtained by using Formula 8.

In operation 644, a coordinate axis of the virtual plane is obtained by using the points p'0, p'1, p'2, and p'3 which are obtained by mapping coordinates of the four fingertips to the plane P.

Figure 6D:
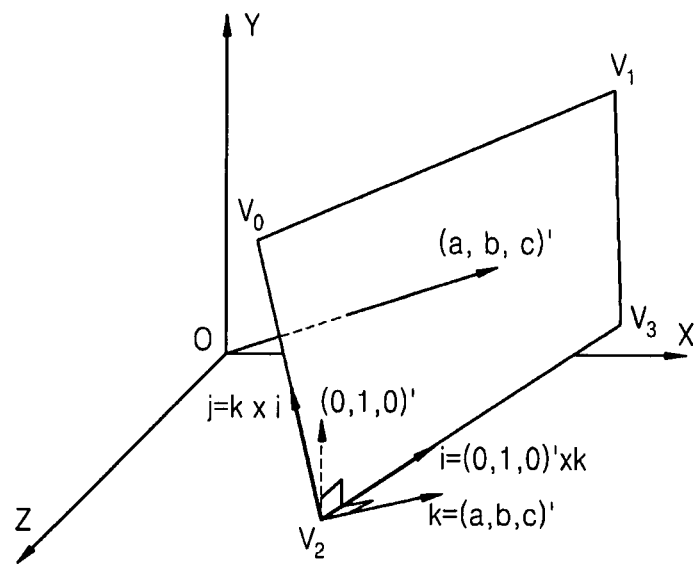
FIG. 6D illustrates directions of coordinate axes of a virtual plane created by using a second example of initializing the virtual panel according to an embodiment of the present invention.

FIG. 6D illustrates directions of coordinate axes of a virtual plane created by using the second example of initializing the virtual panel according to an embodiment of the present invention. Referring to FIG. 6D, a unit vector k is a normal vector $$\begin{pmatrix} a \\ b \\ c \end{pmatrix}$$

since it is perpendicular to the virtual plane. A unit vector i is perpendicular to a vector (0, 1, 0) and the unit vector k. Thus, the unit vector i is obtained from a cross product between the vector (0, 1, 0) and the unit vector k. That is, the horizontal axis of the virtual plane becomes a direction of the unit vector i. In addition, since a unit vector j is perpendicular to the unit vector i and the unit vector k, the unit vector j is obtained from a cross product between the unit vector k and the unit vector i. The direction of the virtual plane is indicated by the unit vector i, the unit vector j, and the unit vector k as shown in FIG. 6D.

In operation 645, a spatial coordinate of the four edges of the virtual plane is obtained. As shown in FIG. 6B, the four edges V0, V1, V2, and V3 of the virtual plane are points which move from the four points P'0, P'1, P'2, and P'3 in directions i and j. The spatial coordinates of the four edges V0, V1, V2, and V3 are obtained by using Formula 10.

$$V_0 = p_0' + a_0 \cdot i = p_2' + b_0 \cdot j$$

$$V_1 = p_0' + a_0 \cdot i = p_1' + b_1 \cdot j$$

$$V_2 = p_3' + a_2 \cdot i = p_2' + b_2 \cdot j$$

$$V_3 = p_3' + a_3 \cdot i = p_1' + b_3 \cdot j \quad \text{[Formula 10]}$$

Herein, a and b are arbitrary values.

In operation 646, the virtual plane is initialized to a new virtual plane having vertices corresponding to the spatial coordinate values of the four edges of the virtual plane.

Figure 6E:
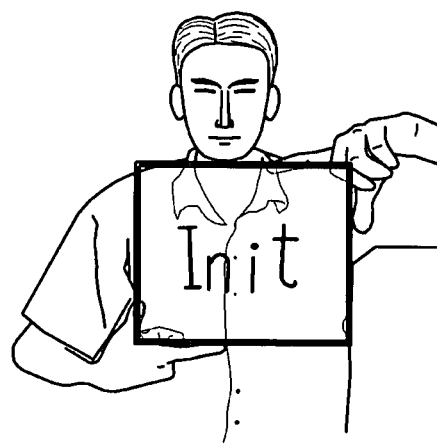
FIG. 6E illustrates the size of a virtual plane created by using a second example of initializing a virtual plane according to an embodiment of the present invention.

FIG. 6E illustrates the size of a virtual plane created by using the second example of initializing a virtual plane according to an embodiment of the present invention. The virtual plane has a horizontal axis and a vertical axis, which correspond to directions indicated by the fingers used in the hand gesture illustrated in FIG. 6. According to a method of initializing a virtual plane by using the second example of initializing a virtual plane, the virtual plane is initialized only with the hand gesture. Thus, it is possible to initialize the virtual plane at a desired place with a desired size without having to use another device.

Figure 7A:
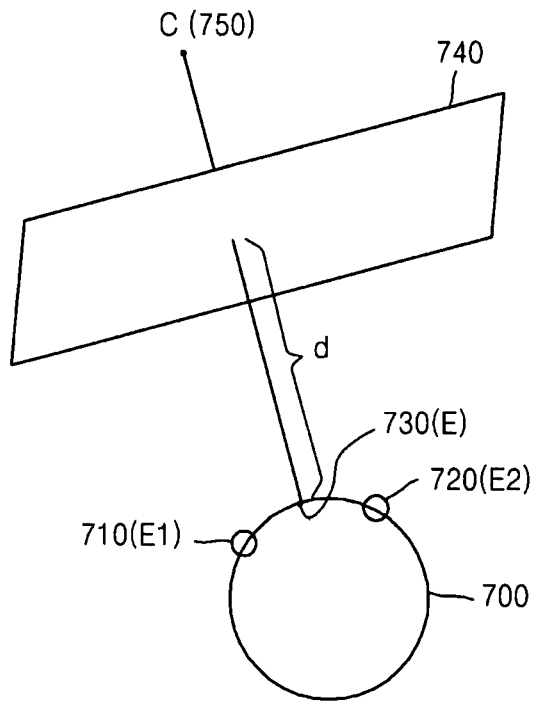
FIG. 7A is a view for explaining a third example of initializing a virtual plane according to an embodiment of the present invention.

FIG. 7A is a view for explaining a third example of initializing a virtual plane according to an embodiment of the present invention. In the third example of initializing a virtual plane, a virtual plane 730 is automatically created between a user 700 and a TV 760 and the virtual plane 730 is spaced apart from the user 700 by a distance d.

Figure 7B:
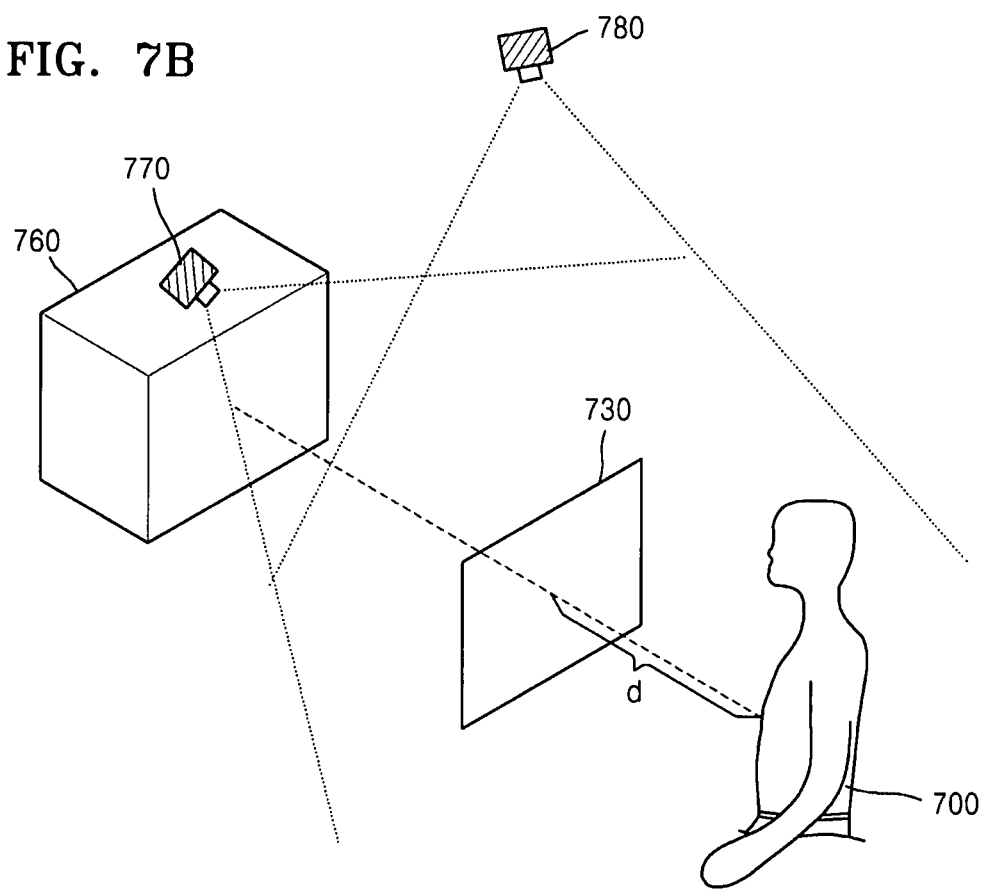
FIG. 7B is a view for explaining a method of initializing a virtual plane by using a third example of initializing a virtual plane according to an embodiment of the present invention.

FIG. 7B is a view for explaining a method of initializing a virtual plane by using the third example of initializing a virtual plane according to an embodiment of the present invention.

In the third example, a user 700 determines a user location and a direction from a TV by using a center 730 between two eyes 710 and 720. A virtual plane 740 is initialized at a point spaced apart from the TV by a distance d. Referring to FIG. 7B, spatial coordinates of the eyes 710 and 720 are detected by an image capture device. A spatial coordinate of the left eye 710 is defined as E1, and a spatial coordinate of the right eye 720 is defined as E2. Hence, a spatial coordinate E of the center of the two eyes 710 and 720 is a median value between the spatial coordinate E1 and the spatial coordinate E2. The virtual plane 740 may be located at a point spaced apart from the eyes 710 and 720 by a predetermined distance d. If this is the case, a coordinate of the center of the TV is C(750).

Figure 7C:
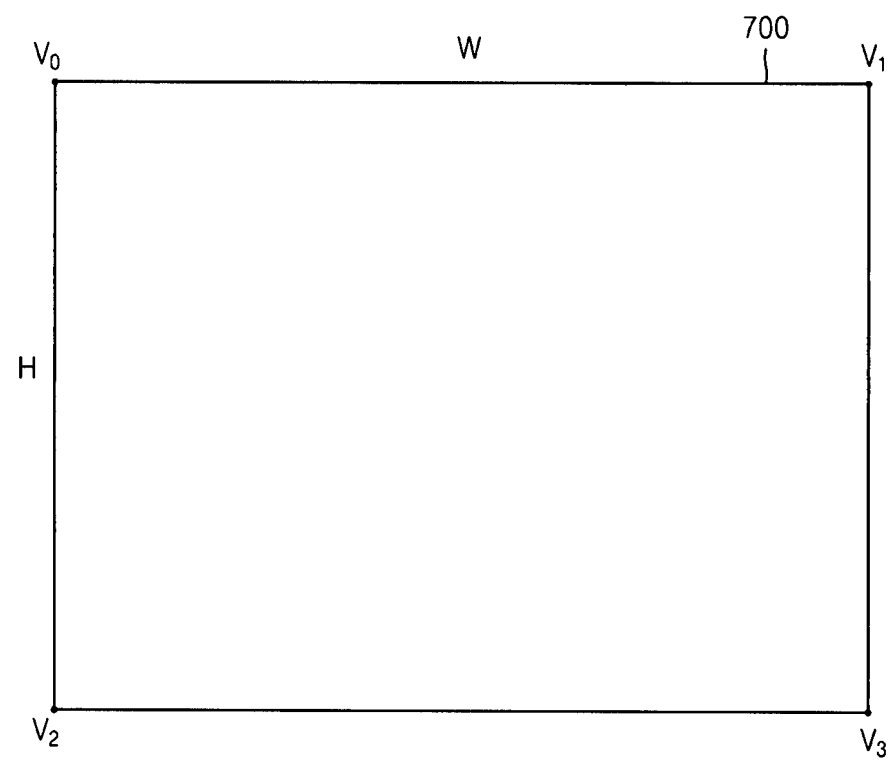
FIG. 7C illustrates a virtual plane, which is initialized by using the third example of initializing a virtual plane, and an eye location according to an embodiment of the present invention.
Figure 7C:
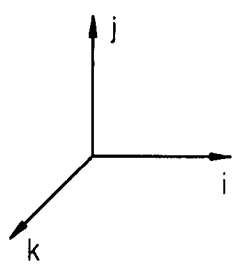

FIG. 7C illustrates a virtual plane, which is initialized by using the third example of initializing a virtual plane, and an eye location according to an embodiment of the present invention. Referring to FIG. 7C, in the third example of initializing a virtual plane, a virtual plane 700 has a predetermined length and width. That is, the virtual plane 700 has a width W and a height H. In this case, the coordinate axis of the virtual plane 700 is determined by using Formula 11.

A. $k=(E-C)/|E-C|$

B. $(0,1,0)^T \times k, i = l/|l|$

C. $k \times i$ [Formula 11]

Herein, E denotes a coordinate of the center between two eyes, and C denotes a coordinate of the center of a TV.

That is, in the initialized virtual plane, the unit vector i of the x-axis, the unit vector j of the y-axis, and the unit vector k of the z-axis are determined by A, B, and C of Formula 11.

A. $V_0 = E - kXd + \dfrac{W}{2} \cdot i + \dfrac{H}{2} j$ [Formula 12]

B. $V_1 = E - kXd + \dfrac{W}{2} \cdot i + \dfrac{H}{2} j$

C. $V_2 = E - kXd - \dfrac{W}{2} \cdot i - \dfrac{H}{2} j$

D. $V_3 = E - kXd + \dfrac{W}{2} \cdot i - \dfrac{H}{2} j$

Herein, k denotes a unit vector perpendicular to the virtual plane, i denotes a direction vector corresponding to a horizontal axis of the virtual plane, and j denotes a direction vector corresponding to the vertical axis of the virtual plane. Furthermore, d denotes a distance between the virtual plane and the eyes, W denotes a width of the virtual plane, and H denotes a height of the virtual plane.

The coordinate values of the four edges of the virtual plane are obtained by using Formula 12. That is, as indicated by A of Formula 12, a left upper edge V0 of the virtual plane has a coordinate value corresponding to a point that moves from E in the z-axis direction by d, in the x-axis direction by W/2, and in the y-axis direction by H/2. As indicated by B of Formula 12, a right upper edge V1 of the virtual plane has a coordinate value corresponding to a point that moves from E in the z-axis direction by d, in the x-axis direction by W/2, and in the y-axis direction by H/2. As indicated by C of Formula 12, a right upper edge V2 of the virtual plane has a coordinate value corresponding to a point that moves from E in the z-axis direction by d, in the x-axis direction by W/2, and in the y-axis direction by H/2. As indicated by D of Formula 12, a right upper edge V3 of the virtual plane has a coordinate value corresponding to a point that moves from E in the z-axis direction by d, in the x-axis direction by W/2, and in the y-axis direction by H/2. The location of an origin V2 of the virtual plane can be determined by using Formula 12. The origin V2 corresponds to a coordinate of the left lower edge of the virtual plane. According to the third example of initializing a virtual plane, the virtual plane is initialized by using only a user location. Thus, the user can initialize the virtual plane at a desired place without having to use another device.

Referring back to FIG. 3, a method of controlling an interface of an electronic device by using a virtual plane will now be described according to an embodiment of the present invention.

In operation 320, a marker is detected, and a spatial coordinate value of the detected marker is obtained. The marker is an input device controlling an electronic device, such as a mouse cursor for a computer. The marker controls a UI of the electronic device by using the virtual plane.

Figure 8A:
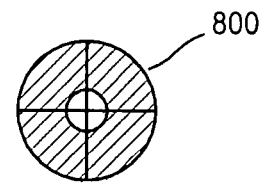
FIG. 8A is a view for explaining a first example of detecting a marker according to an embodiment of the present invention.

FIG. 8A is a view for explaining a first example of detecting a marker according to an embodiment of the present invention. In the first example of detecting a marker, an object 800 having a specific color as shown in FIG. 8A is detected as a marker. According to the first example of detecting a marker, when the specific color is red, it is detected as the marker.

$$r>g*1.2+30 \&\& r>b*1.2+30 \&\& r>g+b-10 \&\& r>100 \&\& g<40 \&\& b<40$$ [Formula 13]

Herein, in an RGB domain, r denotes a red component, g denotes a green component, and b denotes a blue component.

Formula 13 shows a requirement for color to be detected as the marker. An object satisfying the condition of Formula 13 is regarded as a red object. Thus, the object satisfying Formula 13 is detected as the marker. This is only an example of a specific condition of color detected as the mark and the present invention is not limited thereto.

Figure 8B:
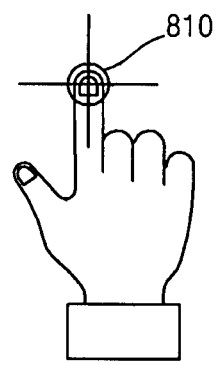
FIG. 8B is a view for explaining a second example of detecting a marker according to an embodiment of the present invention.

FIG. 8B is a view for explaining a second example of detecting a marker according to an embodiment of the present invention. In the second example of detecting a maker, an index finger tip 810 is detected as a marker. In this case, a skin color, a shape, and a depth are used to determine whether a captured image is a marker.

Figure 8C:
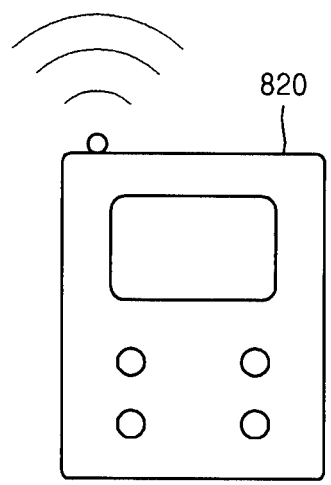
FIG. 8C is a view for explaining a third example of detecting a marker according to an embodiment of the present invention.

FIG. 8C is a view for explaining a third example of detecting a marker according to an embodiment of the present invention. In the third example of detecting a marker, an emitter 820 that emits a signal is detected as a marker. In this case, a receiver has to be additionally placed so as to detect an emitted signal. The receiver detects a signal emitted by the emitter 820 and detects the marker according to a direction of the detected signal.

Referring back to FIG. 3, the method of controlling an interface of an electronic device by using a virtual plane will be described according to an embodiment of the present invention.

In operation 330, a spatial coordinate value of the detected marker is converted into a location on the virtual plane. Formula 14 is used to represent the location of the marker on the virtual plane. That is, Formula 14 is used to represent the location of the marker according to the left lower vertex V2 that is the origin of the virtual plane of the marker.

$$M_v=((M-V_2)*i/|V_3-V_2|,(M-V_2)*j/|V_0-V_2|,(M-V_2)*k/|V_1-V_2|)$$ [Formula 14]

Herein, Mv denotes the location of a marker on the virtual plane, and M denotes a spatial coordinate value of the marker. Furthermore, i denotes a unit vector of the x-axis (horizontal axis) of the virtual plane, j denotes a unit vector of the y-axis (vertical axis) of the virtual plane, and k denotes a unit vector of the z-axis (an axis perpendicular to the virtual plane).

According to Formula 14, the location of the marker with respect to the origin V2 of the virtual plane is obtained. When a value for indicating the location of the marker with respect to the origin V2 is divided by the width and height of the virtual plane, a relative location of the marker can be represented with respect to the origin of the virtual plane. The size of the location of the marker represented by using Formula 14 is in the range of 0 to 1, if it exists within the virtual plane. If the size of i is 0, the marker is located at the origin V2 of the virtual plane. If the size of i is 1, the marker is located at the right lower vertex V3 of the virtual plane. Furthermore, if the size of j is 0, the marker is located at VERTEX V0 of the virtual plane. If the size of j is 1, the marker is located at the left upper vertex V0 of the virtual plane. Furthermore, if the size of z is 0, the marker is located on the virtual plane.

In operation 340, the location and the state of a screen pointer corresponding to the marker are determined. The screen pointer is defined as a indicator which corresponds to the marker spatially located and is displayed on the screen of the electronic device. That is, in the case of an input device such as a mouse that controls the electronic device by using a marker such as a mouse cursor, the screen pointer is displayed on the screen of the electronic device similarly to the mouse cursor. Thus, the screen pointer serves to select various menus for operating the electronic device. The location of the screen pointer can be obtained by using Formula 15.

$$S=(Mvx*Rx, Mvy*Ry)$$ [Formula 15]

Herein, S denotes the location of a screen pointer, Mvx denotes a spatial coordinate value of the marker in the x-axis direction on the virtual plane, and Mvy denotes spatial coordinate values of a marker in the y-axis direction on the virtual plane. Furthermore, Rx denotes a horizontal screen resolution, and Ry denotes a vertical screen resolution.

That is, as expressed by Formula 15, the location of the marker on the virtual plane is multiplied by a screen resolution, thereby obtaining the location of the screen pointer on the screen of the electronic device. If the size of the virtual plane is defined as 1, the location of the marker on the virtual plane represents a relative location of the marker. Thus, the location of the marker is proportionally changed on the screen of the electronic device. In regard to the coordinate values x, y, and z of the marker created on the virtual plane, x and y are represented by the location of the screen pointer on the screen, and z is represented by a coordinate value representing a spatial movement of the marker.

Figure 9:
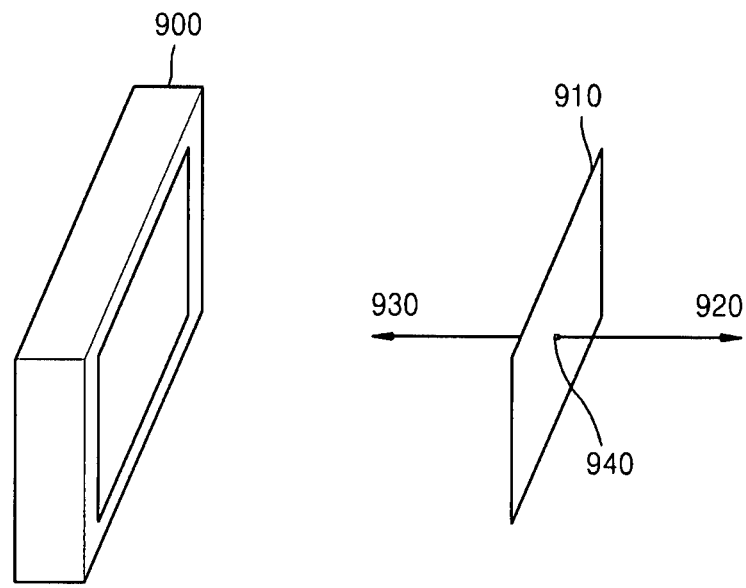
FIG. 9 illustrates changes in the location of a marker on a virtual plane when a z-coordinate of the maker changes according to an embodiment of the present invention.

FIG. 9 illustrates changes in the location of a marker on a virtual plane when a z-coordinate of the maker changes according to an embodiment of the present invention. Referring to FIG. 9, the location of the marker on the virtual plane can be found according to the z-coordinate value of the marker. An electronic device 900 and a virtual plane 910 are located as shown in FIG. 9. In this case, if the z-coordinate value of the marker is greater than 0, the marker is located at a backward position 920 of the virtual plane 910 located in front of a screen. On the other hand, if the z-coordinate value of the marker is less than 0, the marker is located at a space 930 between the screen and the marker. If the z-coordinate value of the marker is 0, the marker exists on the virtual plane 940.

As described above, the location of the marker on the virtual plane is determined according to the z-coordinate value of the marker. Thus, when the z-coordinate value of the marker is modified according to a reference value of 0 by moving the marker, functions of the electronic device can be performed.

Figure 10:
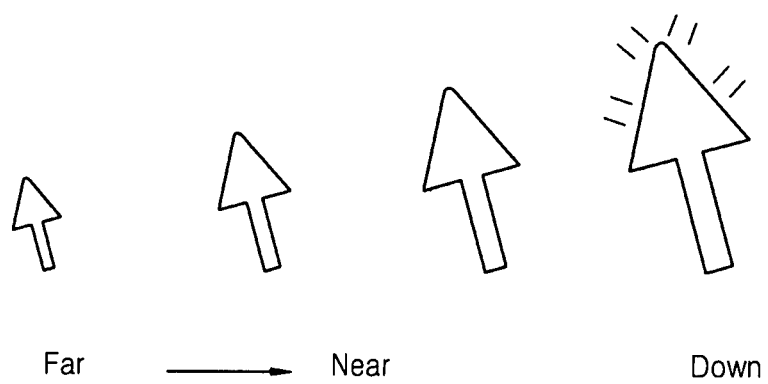
FIG. 10 illustrates a relationship between the size of a screen pointer and the location of a marker according to an embodiment of the present invention.

FIG. 10 illustrates a relationship between the size of a screen pointer and the location of a marker according to an embodiment of the present invention. The screen pointer is displayed on the screen of the electronic device having a different shape and at a different location according to the location of the marker. Thus, the user can recognize a distance of the marker from the virtual plane with reference to the design of the screen pointer. In the present embodiment, an icon size indicating the screen pointer displayed on the screen varies depending on the distance of the marker from the virtual plane. That is, since the marker is generally located on the virtual plane when its z-coordinate value is 0, as the z-coordinate value of the marker approaches 0 and thus approaches the virtual plane, the icon size of the screen pointer displayed on the screen increases. Moreover, if the z-coordinate value of the marker is 0, the marker is located on the virtual plane. In this case, the screen pointer is formed so as to represent the marker located on the virtual plane. In the present embodiment, the vicinity of an arrow shaped icon glows as shown in FIG. 10.

Referring back to FIG. 3, a method of controlling a UI of an electronic device by using a virtual plane will now be described according to an embodiment of the present invention.

In operation 350, the UI of the electronic device is controlled by moving the marker.

Figure 11:
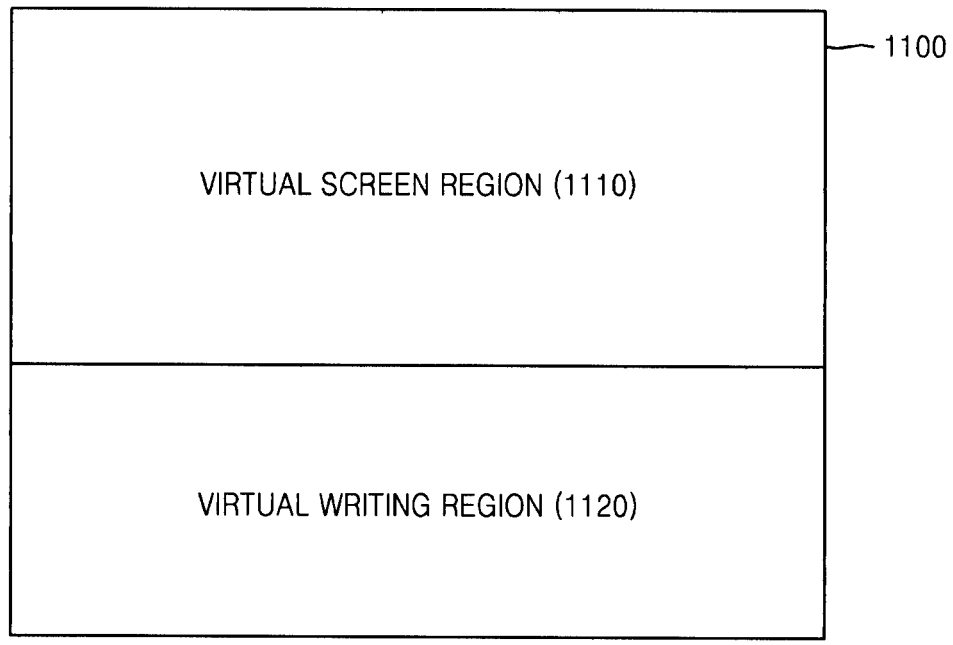
FIG. 11 illustrates regions of a virtual plane used to control a UI of an electronic device, divided based on functions according to an embodiment of the present invention.

FIG. 11 illustrates regions of a virtual plane used to control a UI of an electronic device, where the virtual plane is divided based on functions according to an embodiment of the present invention. The virtual plane corresponds to the screen of the electronic device. A virtual plane 1100 includes a virtual screen region 1110 and a virtual writing region 1120. In the virtual plane 1100, the UI of the electronic device is controlled when a menu is selected by using a screen pointer. In the virtual writing region 1120, the UI of the electronic device is controlled when a control command is directly written on the screen.

Figure 12:
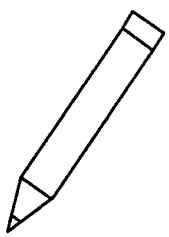
FIG. 12 illustrates an icon indicating a screen pointer displayed when a marker exists in a virtual writing region of a virtual plane according to an embodiment of the present invention.

FIG. 12 illustrates an icon indicating a screen pointer displayed when a marker exists in a virtual writing region of a virtual plane according to an embodiment of the present invention. In general, when the marker exists in the virtual screen region 1110 of the virtual plane 1100 illustrated in FIG. 11, the arrow shaped icon is displayed on the screen of the electronic device as shown in FIG. 10. In order to easily recognize the location of the marker, the icon of the screen pointer displayed on the screen of the electronic device has to change its shape when the marker moves from the virtual screen region 1110 to the virtual writing region 1120 of the virtual plane 1100. When the marker moves from the virtual screen region 1110 to the virtual writing region 1120 of the virtual plane 1100, the icon of the screen pointer changes to the shape of pencil as shown in FIG. 12.

Figure 13:
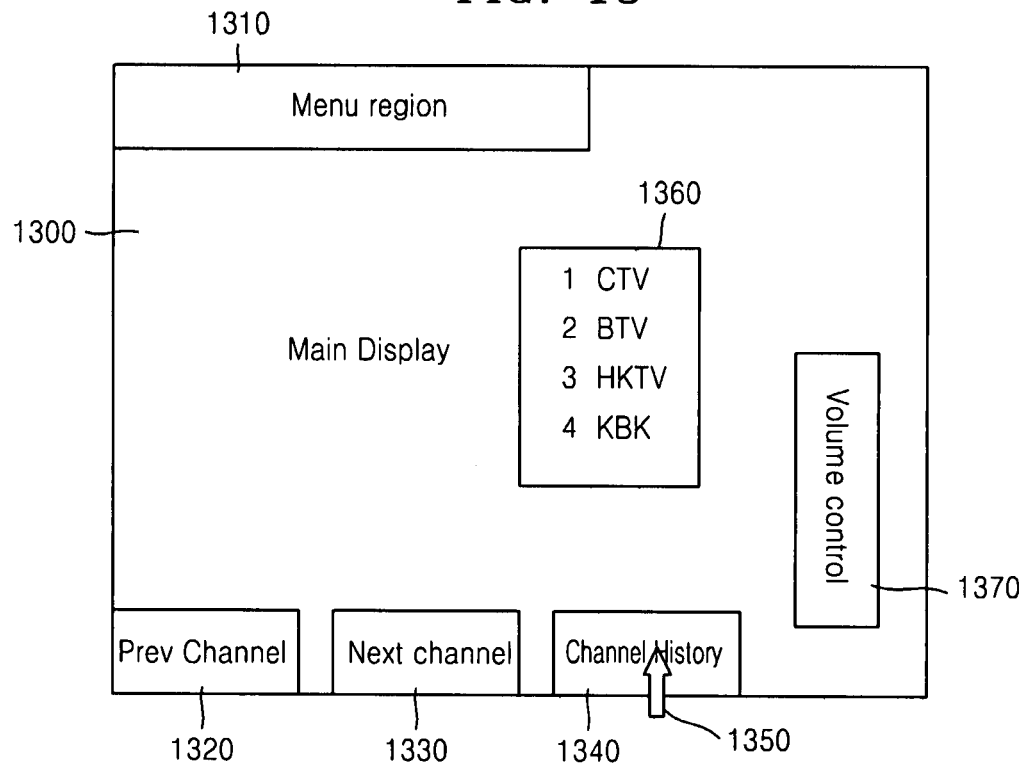
FIG. 13 illustrates a menu displayed on a screen of an electronic device corresponding to a virtual screen region of a virtual plane according to an embodiment of the present invention.

FIG. 13 illustrates a menu displayed on a screen of an electronic device corresponding to a virtual screen region of a virtual plane according to an embodiment of the present invention. The menu includes a main display 1300, which appears all the time, and a hidden menu which appears when it is pointed to by a screen pointer. In the present embodiment, the hidden menu includes a menu region 1310, a previous channel 1320, a next channel 1330, a channel history 1340, and a volume control 1370. Furthermore, like the channel history 1340 illustrated in FIG. 13, the hidden menu may have a form of a popup menu showing a sub menu 1360 corresponding to the hidden menu when it is pointed to by the screen pointer 1350. Although the menu is configured as shown in FIG. 13 in the present embodiment, the present invention is not limited thereto.

Figure 14A:
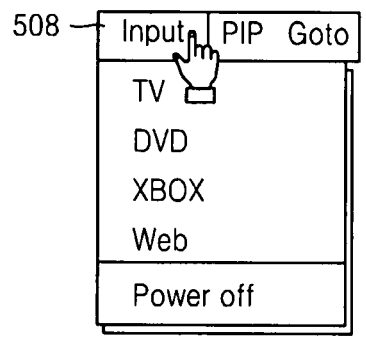
FIGS. 14A to 14C illustrate menus displayed on a screen of a digital television (TV) set corresponding to a virtual screen region of a virtual plane when the digital TV is used as an electronic device according to an embodiment of the present invention.
Figure 14B:
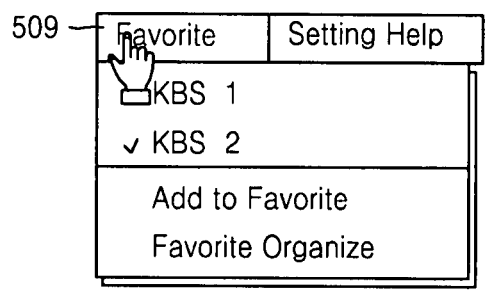
Figure 14C:
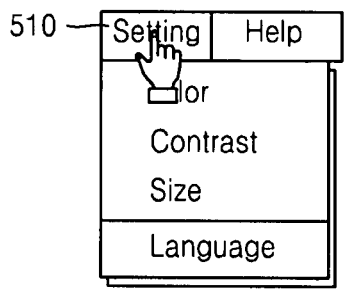

FIGS. 14A to 14C illustrate menus displayed on a screen of a digital television (TV) set corresponding to a virtual screen region of a virtual plane when the digital TV is used as an electronic device according to an embodiment of the present invention. The menus illustrated in FIGS. 14A to 14C are generally used in a personal computer (PC). The menus are not shown in the digital TV. However, in the present embodiment, the menus illustrated in FIGS. 14A to 14C are used to control the electronic device by using the virtual plane. FIG. 14A illustrates a menu associated with a video source. Using the menu illustrated in FIG. 14A, the user selects usage of the electronic device from a console (e.g., TV, DVD, or Xbox) and a web page. FIG. 14B illustrates a menu showing a favorite channel list. The user selects a desired channel through the menu illustrated in FIG. 14B and manages the channel list. FIG. 14C illustrates a display setting menu. The user determines display settings through the menu illustrated in FIG. 14C.

Figure 15:
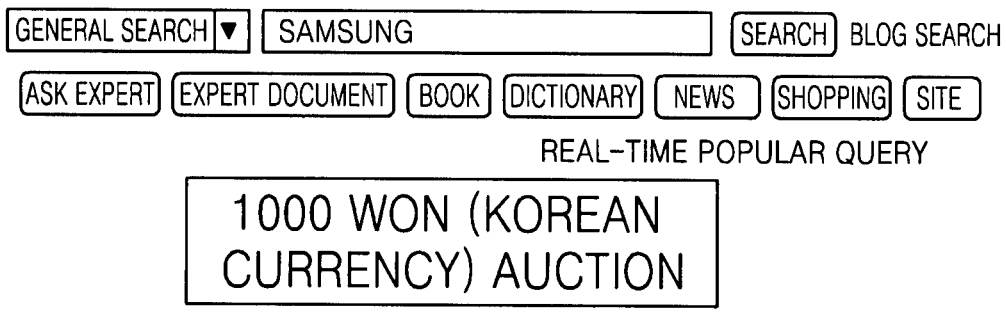
FIG. 15 illustrates a soft keyboard which is one of a plurality of menus corresponding to a virtual screen region of a virtual plane according to an embodiment of the present invention.
Figure 15:
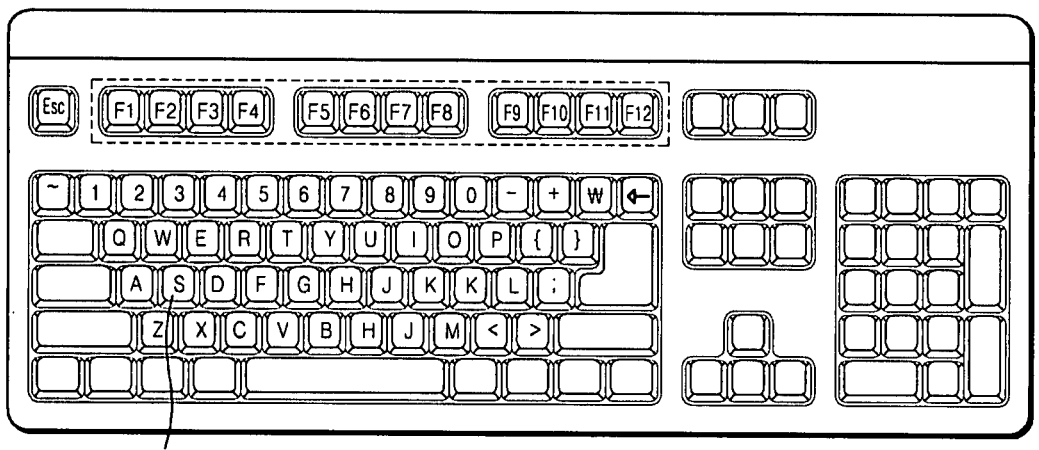

FIG. 15 illustrates a soft keyboard which is one of menus corresponding to a virtual screen region of a virtual plane according to an embodiment of the present invention. The user moves the marker to select a desired button 1510 of the soft keyboard displayed on a screen and thus controls a UI of the electronic device.

Figure 16A:
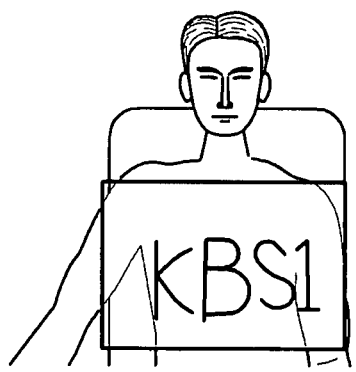
FIGS. 16A to 16B are views for explaining a first example of controlling a UI of an electronic device by using a virtual writing region of a virtual plane according to an embodiment of the present invention.
Figure 16B:
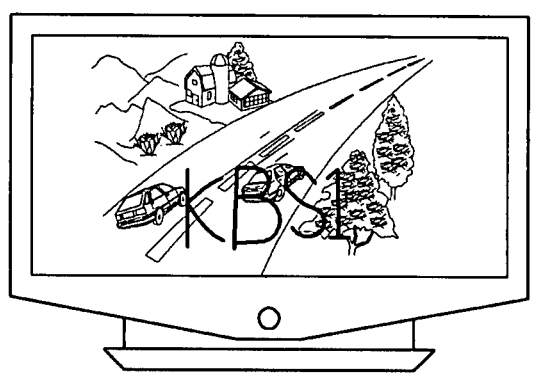

FIGS. 16A to 16B are views for explaining a first example of controlling a UI of an electronic device by using a virtual writing region of a virtual plane according to an embodiment of the present invention. FIG. 16A is a view for explaining an autographical writing function of the UI according to an embodiment of the present invention. While watching a TV program, if the user desires to change a channel, as shown in FIG. 16A, the user only has to write a new channel name (e.g., KBS 1) in the virtual writing region of the virtual plane. Then, as shown in FIG. 16B, the channel name (e.g., KBS 1) is displayed on the screen of the electronic device, and the current channel is changed to a new channel (e.g., KBS 1). According to this function, the user can conveniently select channels.

Figure 17A:
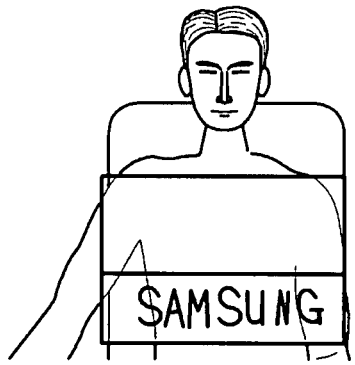
FIGS. 17A to 17C are views for explaining a second example of controlling a UI of an electronic device by using a virtual writing region of a virtual plane according to an embodiment of the present invention.
Figure 17B:
Figure 17C:
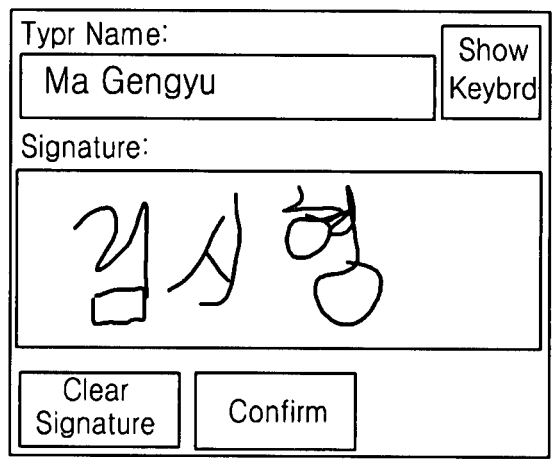

FIGS. 17A to 17C are views for explaining a second example of controlling a UI of an electronic device by using a virtual writing region of a virtual plane according to an embodiment of the present invention. In general, a word to be searched for by surfing the Internet is directly input by using a keyboard. However, in the present embodiment, a word is directly written as shown in FIG. 17A, the word is then input to a screen as shown in FIG. 17B, and then the word input to the screen can be searched for by using the Internet. When a user's signature is needed as shown in FIG. 17C, the user signs on the virtual writing region of the virtual plane. Then, the signature is displayed on the screen.

Figure 18A:
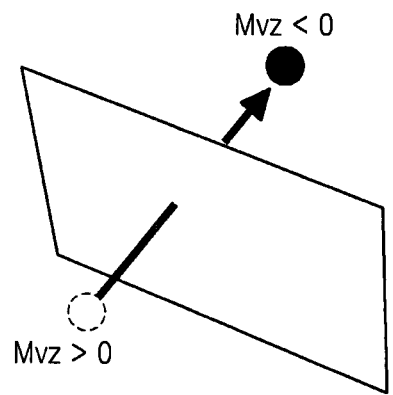
FIGS. 18A and 18B are views for explaining a first example of selecting a UI of an electronic device depending on the movement of a marker according to an embodiment of the present invention.
Figure 18B:
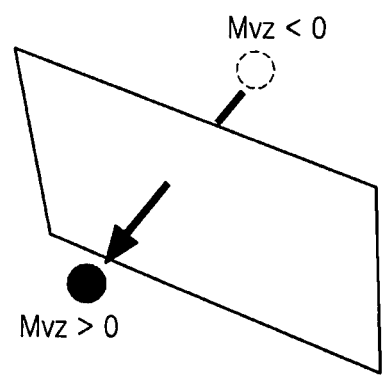

FIGS. 18A and 18B are views for explaining a first example of selecting a UI of an electronic device depending on the movement of a marker according to an embodiment of the present invention. Referring to FIG. 18A, when a z-coordinate value of the marker is modified from a value greater than 0 to a value less than 0, the marker passes though the virtual plane. After the marker passes through the virtual plane, a push-down event is executed. Referring to FIG. 18B, when a coordinate value of the marker is changed from a value less than 0 to a value greater than 0, the marker passes through the virtual plane. In this case, a "released" event is executed. This event is used for the virtual writing region of the virtual plane. That is, when the user writes a word, the marker is moved in a push-down state. On the other hand, when the user does not write a word, the marker is moved in a released state.

Figure 19:
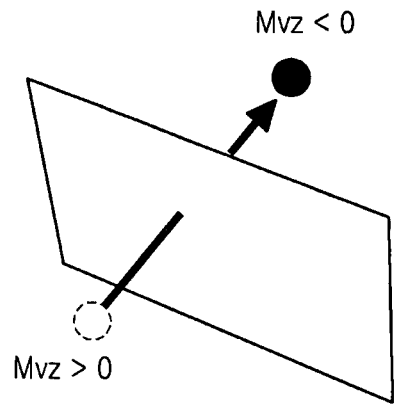
FIG. 19 is a view for explaining a second example of selecting a UI of an electronic device depending on the movement of a marker according to an embodiment of the present invention.

FIG. 19 is a view for explaining a second example of selecting a UI of an electronic device depending on the movement of a marker according to an embodiment of the present invention. Referring to FIG. 19, when a z-coordinate value of the marker is modified from a value greater than 0 to a value less than 0, the marker passes though the virtual plane. After the marker passes through the virtual plane, a button click event is executed. If the button click event is executed when a screen pointer is positioned at a menu item that the user desires to select, the function of the menu item is performed.

Figure 20:
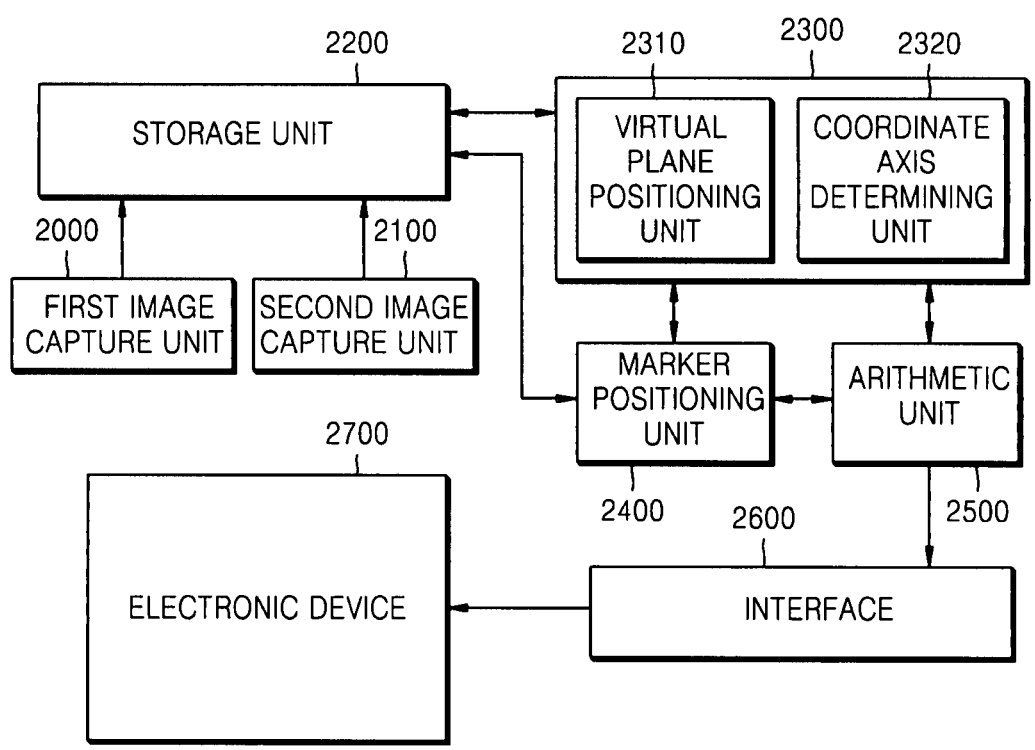
FIG. 20 illustrates an apparatus for controlling a UI of an electronic device by using a virtual plane according to another embodiment of the present invention.

FIG. 20 illustrates an apparatus for controlling a UI of an electronic device by using a virtual plane according to another embodiment of the present invention.

The apparatus includes a first image capture unit 2000, a second image capture unit 2100, a storage unit 2200, a virtual plane initializing unit 2300, a marker positioning unit 2400, and an arithmetic unit 2500.

Referring to FIG. 20, the first image capture unit 2000 and the second image capture unit 2100 may be located at any place as long as they can capture an image of a front side of an electronic device 2700. That is, the first image capture unit 2000 and the second image capture unit 2100 are not restricted by the place where the apparatus is installed. Images are three-dimensionally captured by the first image capture unit 2000 and the second image capture unit 2100.

As shown in FIG. 4A, the first image capture unit 2000 and the second image capture unit 2100 capture images of the vertices of the checkerboard in which check patterns are formed and arranged at uniform intervals in four directions. The captured images are stored in the storage unit 2200.

The images stored in the storage unit 2200 are substituted to Formula 1 and Formula 2 so as to determine intrinsic parameters and extrinsic parameters. On the basis of these parameters, calibration is carried out for the first image capture unit 2000 and the second image capture unit 2100. That is, by calibrating the first image capture unit 2000 and the second image capture unit 2100, a correlation between the location of an image display unit of an image capture unit and a spatial coordinate value of an image is determined.

When the calibration for the first image capture unit 2000 and the second image capture unit 2100 is completed, the first image capture unit 2000 and the second image capture unit 2100 capture an image of the checkerboard illustrated in FIG. 5A, an image of the hand gesture illustrated in FIG. 6A, and an image of the eyes illustrated in FIG. 7A. The captured images are all stored in the storage unit 2200. The first image capture unit 2000 and the second image capture unit 2100 continue to capture images including a marker image. The captured images are all stored in the storage unit 2200.

Besides the images captured by the first image capture unit 2000 and the second image capture unit 2100, all variables and data (e.g., intrinsic parameters, extrinsic parameters, a coordinate axis system, etc) which are required to analyze input images are also stored in the storage unit 2200.

The virtual plane initializing unit 2300 initializes the virtual plane by using the method described with reference to FIGS. 5B, 6C, and 7A. The virtual plane initializing unit 2300 receives an image from the storage unit 2200 in which the images captured by the image capture units 2000 and 2100 are stored. Then, the virtual plane initializing unit 2300 initializes the virtual plane according to the procedures illustrated in FIGS. 5B, 6C, and 7A. That is, a spatial coordinate of an image required to initialize the virtual plane is obtained. The obtained image is used to determine the locations of the four vertices of the virtual plane and the coordinate axis of the virtual plane by computation. Then, the virtual plane is initialized. An arithmetic process required to initialize the virtual plane is the same as the aforementioned description about the method of controlling the UI of the electronic device by using the virtual plane. However, in the case of initializing the virtual plane by using the images of the hand gesture, a virtual plane positioning unit 2310 of the virtual plane initializing unit 2300 determines the location of the virtual plane by using Formulas 5, 6, and 7, so that the virtual plane is the nearest to spatial coordinates of the four images of the gesture received from the storage unit 2200. A coordinate axis determining unit 2320 of the virtual plane initializing unit 2300 determines coordinate axes of the virtual plane by performing operation 644 illustrated in FIG. 6C. The determined coordinate axes are the same as shown in FIG. 6D. After the location and coordinate axes of the virtual plane are determined, the virtual plane is initialized so that the four spatial coordinates obtained based on the determined coordinate axes correspond to the vertices of the virtual plane. In this case, the four spatial coordinates are determined by using Formula 10.

The marker positioning unit 2400 receives information on a marker image from the storage unit 2200 and detects the marker by using the marker detection method illustrated in FIGS. 8A, 8B, and 8C. Furthermore, the marker positioning unit 2400 receives information on the virtual plane initialized by the virtual plane initializing unit 2300 and determines the location of the marker on the virtual plane. That is, the location of the marker on the virtual plane is determined by using Formula 14. Then, a relationship between the marker and the virtual plane is determined, where the relationship depends on changes in the location of the marker. The marker positioning unit 2400 continuously computes the location of the marker according to the movement of the marker.

The arithmetic unit 2500 receives information on the virtual plane initialized by the virtual plane initializing unit 2300 and receives information on the location of the marker from the marker positioning unit 2400. Furthermore, the arithmetic unit 2500 determines a relationship between the marker and the screen pointer shown in FIG. 10 and computes the location of the screen pointer by using Formula 15. Accordingly, the arithmetic unit 2500 displays the screen pointer on the image display unit of the electronic device 2700. That is, the arithmetic unit 2500 continuously computes the location of the screen pointer that changes in response to the movement of the marker and selects a menu of the electronic device 2700 by using the marker as described with reference to FIGS. 11 to 19. Furthermore, the arithmetic unit 2500 computes data regarding a state of the screen pointer that selects the menu of the electronic device 2700 in response to the movement of the marker. That is, a menu displayed in the video display unit of the electronic device 2700 is selected by the screen pointer while moving the marker. Then, a state of the screen pointer is computed which indicates that the menu displayed on the image display unit of the electronic device 2700 is selected by the screen pointer. This is input to a UI 2600 of the electronic device 2700. Data regarding the location of the screen pointer and the state computed by the arithmetic unit 2500 are input to the UI 2600 of the electronic device 2700. Thus, the user can control the electronic device 2700 by selecting a desired menu.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a UI (user interface) of an electronic device by using a virtual plane, the method comprising:
    detecting at least four points corresponding to at least four fingertips of a user from two or more images displayed in an image display unit of a first image capture device and an image display unit of a second image capture device;
    calculating three-dimensional (3D) spatial coordinates of each of the detected at least four points;
    initializing the virtual plane, used to control the UI of the electronic device;
    determining a location of a marker indicated by a specific image on the virtual plane;
    displaying a screen pointer corresponding to the marker at a position where the marker is located in an image display unit corresponding to the virtual plane; and
    selecting a menu of the electronic device pointed to by the screen pointer while moving the marker,
    wherein the virtual plane is initialized based on the three-dimensional spatial coordinates of the detected at least four points such that the virtual plane passes through a point corresponding to a center of the detected at least four points.

2. The method of claim 1, further comprising determining a correlation between the locations of the images displayed in the image display units and the spatial coordinates of the at least four points detected from the two or more images according to locations where images captured by the first and second image capture units are displayed in the image display units, wherein the initializing further comprises:
    detecting the spatial coordinates of two or more images displayed in the image display units of the image capture devices according to the determined correlation; and
    initializing the virtual plane according to the detected spatial coordinates.

3. The method of claim 1, wherein the detected at least four points comprise tips of an index finger and a thumb of a right hand of the user and tips of an index finger and a thumb of a left hand of the user when the user makes a gesture to form a specific figure by using the index fingers and thumbs.

4. The method of claim 3, wherein the initializing of the virtual plane ether comprises:
    determining a plane nearest to spatial coordinates of the at least four points detected from the four tips of the index fingers and thumbs in a gesture in which the index fingers and the thumbs are perpendicular to each other;
    determining axis coordinates of the virtual plane so that a direction perpendicular to the determined plane is defined as a z-axis direction; and
    initializing the virtual plane so that vertices correspond to four spatial coordinates obtained based on the determined coordinate axes.

5. The method of claim 1, further comprising detecting a spatial coordinate of the marker according to where an image of the marker captured by the first and second image capture units are displayed in image display units of the respective image capture units, wherein, in the determining, the marker is mapped to the virtual plane to determine the location of the marker on the virtual plane.

6. The method of claim 5, wherein the marker image is an object having a distinctive color.

7. The method of claim 5, wherein the image of the marker corresponds to a fingertip.

8. The method of claim 7, wherein the image corresponding to the fingertip is specified by at least one of a skin color, a shape, and a depth.

9. The method of claim 1, wherein, in the determining, the location of the marker is determined according to coordinate axes of the initialized virtual plane.

10. The method of claim 1, wherein, in the displaying, the screen pointer is displayed at a position obtained by multiplying the location of the marker detected by using the virtual plane by a resolution of the electronic device.

11. The method of claim 1, wherein in the selecting, when the marker passes through the virtual plane as the marker moves, a menu of the electronic device pointed to by the screen pointer is selected.

12. The method of claim 1, wherein the screen pointer is displayed in the image display units of the electronic device as an icon.

13. The method of claim 12, wherein the screen pointer increases in size as the marker approaches the virtual plane.

14. The method of claim 1, wherein the virtual plane comprises a virtual image region corresponding to the image display units of the electronic device.

15. The method of claim 1, wherein the virtual plane comprises the virtual image region, which corresponds to the image display units of the electronic device, and a virtual writing region.

16. The method of claim 15, wherein, in the selecting, a command corresponding to the menu is directly written as text in the virtual writing region while moving the marker to select the menu on the screen.

17. The method of claim 1, wherein the menu of the electronic device comprises a popup menu which appears according to the location of the screen pointer and a normal menu which appears in the image display units of the electronic device.

18. The method of claim 17, wherein the popup menu appears together with a sub-menu of the popup menu when the screen pointer is positioned over the popup menu.

19. The method of claim 1, wherein the menu of the electronic device appears as a keyboard through which various characters can be input.

20. A non-transitory computer-readable medium having embodied thereon a computer program for executing the method of claim 1.

21. The method of claim 1 wherein the user sets the detected at least four points using hand gestures.

22. The method of claim 1, wherein the calculated 3D spatial coordinates are stored.

23. The method of claim 1, wherein the boundary points are set by a user, and the calculated 3D spatial coordinates match a physical location of the boundary points set by the user.

24. An apparatus for controlling a UI (user interface) of an electronic device by using a virtual plane, the apparatus comprising:
a first image capture unit and a second image capture unit which capture images and detect at least four points corresponding to at least four fingertips of a user from two or more images displayed in an image display unit of the first image capture device and an image display unit of the second image capture device when the first and second image capture units capture the images;
a virtual plane initializing unit which initializes the virtual plane used to control the UI of the electronic device;
a marker positioning unit which determines a spatial location of a marker according to a specific image captured by the first and second image capture units and determines a location of the marker on the virtual plane by mapping the spatial location of the marker to a position on the virtual plane; and
an arithmetic unit which computes a location of a screen pointer, which appears on the image display units of the electronic device and corresponds to the location of the marker, and which selects a menu of the electronic device pointed to by the screen pointer that moves along with the movement of the marker,
wherein the virtual plane is initialized based on three-dimensional spatial coordinates of the detected at least four points such that the virtual plane passes through a point corresponding to a center of the detected at least four points.

25. The apparatus of claim 24, wherein the first and second image capture units determine a correlation between the locations of the images displayed in the image display units and the spatial coordinates of the at least four points detected from the two or more images according to locations where images captured by the first and second image capture units are displayed in the image display units.

26. The apparatus of claim 24,
wherein the detected at least four points comprise to tips of an index fingers and a thumb of a right hand of the user and tips of an index finger and a thumb of a left hand of the user when the user makes a gesture to form a specific figure by using the index fingers and thumbs, and
wherein the virtual plane initializing unit comprises:
a virtual plane positioning unit which determines a location of the virtual plane to be a plane nearest to spatial coordinates of the at least four points detected from the four tips of the index fingers and thumbs in a gesture in which the index fingers and the thumbs are perpendicular to each other; and
a virtual plane coordinate axes determining unit which determines axis coordinates of the virtual plane so that a direction perpendicular to the determined plane is defined as a z-axis direction, wherein the virtual plane is initialized so that vertices correspond to four spatial coordinates determined based on the determined coordinate axes.

27. The apparatus of claim 24, wherein the specific image is an object having a distinctive color.

28. The apparatus of claim 24, wherein the specific image corresponds to a fingertip.

29. The apparatus of claim 28, wherein the image corresponding to the fingertip is specified by at least one of a skin color, a shape, and a depth.

30. The apparatus of claim 24, wherein the arithmetic unit computes a location of the screen pointer to be a position obtained by multiplying the location of the marker detected according to the virtual plane by a resolution of the electronic device.

31. The apparatus of claim 24, wherein the arithmetic unit selects a menu of the electronic device pointed to by the screen pointer when the marker passes through the virtual plane as the marker moves.

32. The apparatus of claim 24, wherein the screen pointer is displayed in the image display units of the electronic device as an icon.

33. The apparatus of claim 32, where in the screen pointer increases in size as the marker approaches the virtual plane.

34. The apparatus of claim 24, wherein the virtual plane comprises a virtual image region corresponding to the image display units of the electronic device.

35. The apparatus of claim 24, wherein the virtual plane comprises a virtual image region, which corresponds to the image display units of the electronic device, and a virtual writing region.

36. The apparatus of claim 35, wherein the arithmetic unit selects the menu on the screen by directly writing a command corresponding to the menu as text in the virtual writing region while moving the marker.

37. The apparatus of claim 24, wherein the menu of the electronic device comprises a popup menu which appears according to the location of the screen pointer and a normal menu which appears in the image display units of the electronic device.

38. The apparatus of claim 37, wherein the popup menu appears together with a sub-menu of the popup menu when the screen pointer is positioned over the popup menu.

39. The apparatus of claim 24, wherein the menu of the electronic device appears as a keyboard through which various characters can be input.

\* \* \* \* \*